(12) United States Patent
Hunzinger

(10) Patent No.: US 6,996,391 B2
(45) Date of Patent: Feb. 7, 2006

(54) FORWARD-LINK RESCUE SYNCHRONIZATION METHOD AND APPARATUS

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 403 days.

(21) Appl. No.: 10/029,489

(22) Filed: Dec. 20, 2001

(65) Prior Publication Data

US 2002/0119787 A1 Aug. 29, 2002

Related U.S. Application Data

(60) Provisional application No. 60/257,207, filed on Dec. 20, 2000.

(51) Int. Cl.
H04M 11/00 (2006.01)

(52) U.S. Cl. .................. 455/404.1; 455/434
(58) Field of Classification Search ............. 455/404.1, 455/434, 436–444; 370/345, 350
See application file for complete search history.

(56) References Cited

U.S. PATENT DOCUMENTS

| | | |
|---|---|---|
| 5,081,671 A | 1/1992 | Raith et al. |
| 5,267,261 A | 11/1993 | Blakeney, II et al. |
| 5,301,356 A | 4/1994 | Bodin et al. |
| 5,353,332 A | 10/1994 | Raith et al. |
| 5,530,912 A | 6/1996 | Agrawal et al. |
| 5,640,414 A | 6/1997 | Blakeney, II et al. |
| 5,673,259 A | 9/1997 | Quick, Jr. et al. |
| 5,722,044 A | 2/1998 | Padovani et al. |
| 5,729,826 A | 3/1998 | Gavrilovich |
| 5,749,055 A | 5/1998 | Dahlin |
| 5,781,856 A | 7/1998 | Jacobs et al. |

(Continued)

FOREIGN PATENT DOCUMENTS

EP 1 024 606 A2 8/2000

Primary Examiner—Nay Maung
Assistant Examiner—Edan Orgad
(74) Attorney, Agent, or Firm—Morrison & Foerster, LLP

(57) ABSTRACT

A method and apparatus are disclosed for efficiently synchronizing the transmission and reception of the rescue channel from the network and to the failing MS, respectively, to communicate the rescue channel to the failing MS and rescue the connection. The cycling through of BSs by the MS and the network is preferably coordinated according to a certain set of strategies to guarantee some transmission overlap for at least a predetermined number of frames, and therefore permit a rescue. To improve the efficiency of rescue, in embodiments of the present invention the MS can execute a more sophisticated detection scheme to determine which BSs are actually transmitting a good rescue channel. This scheme includes a combined detection component and a learning progression component.

54 Claims, 9 Drawing Sheets

U.S. PATENT DOCUMENTS

| | | |
|---|---|---|
| 5,884,174 A | 3/1999 | Nagarajan et al. |
| 5,913,167 A | 6/1999 | Bonta et al. |
| 5,937,019 A | 8/1999 | Padovani |
| 6,052,594 A | 4/2000 | Chuang et al. |
| 6,061,337 A | 5/2000 | Light et al. |
| 6,104,927 A | 8/2000 | Willey |
| 6,161,014 A | 12/2000 | Girardeau et al. |
| 6,233,454 B1 | 5/2001 | Sato |
| 6,236,365 B1 | 5/2001 | LeBlanc et al. |
| 6,246,872 B1 | 6/2001 | Lee et al. |
| 6,253,083 B1 | 6/2001 | Hacena et al. |
| 6,337,983 B1 | 1/2002 | Bonta et al. |
| 6,343,216 B1 | 1/2002 | Kim et al. |
| 6,345,185 B1 | 2/2002 | Yoon et al. |
| 6,360,100 B1 | 3/2002 | Grob et al. |
| 6,445,918 B1 | 9/2002 | Hellander |
| 6,512,927 B2 | 1/2003 | Hunzinger |
| 6,519,457 B1 | 2/2003 | Jiang et al. |
| 6,542,744 B1 | 4/2003 | Lin |
| 6,567,666 B2 | 5/2003 | Czaja et al. |
| 6,580,919 B1 | 6/2003 | Saito |
| 6,606,343 B2 | 8/2003 | Zeira et al. |
| 6,671,265 B1 | 12/2003 | Hwang et al. |
| 6,674,736 B1 | 1/2004 | Tiedemann, Jr. |
| 2001/0055969 A1 * | 12/2001 | Bonta et al. ............. 455/436 |
| 2002/0034947 A1 | 3/2002 | Soliman |
| 2002/0037726 A1 | 3/2002 | Czaja et al. |
| 2002/0142776 A1 | 10/2002 | Tiedemann, Jr. |
| 2003/0002525 A1 | 1/2003 | Grilli |
| 2003/0022630 A1 | 1/2003 | Gandhi et al. |
| 2004/0233883 A1 | 11/2004 | Ludwig et al. |

* cited by examiner

Forward Link
 Pilot Channel(s)
 Sync Channel
 Paging Channel(s)
 Traffic Channels ← Reverse Link
 Access Channel
 Traffic Channel(s)

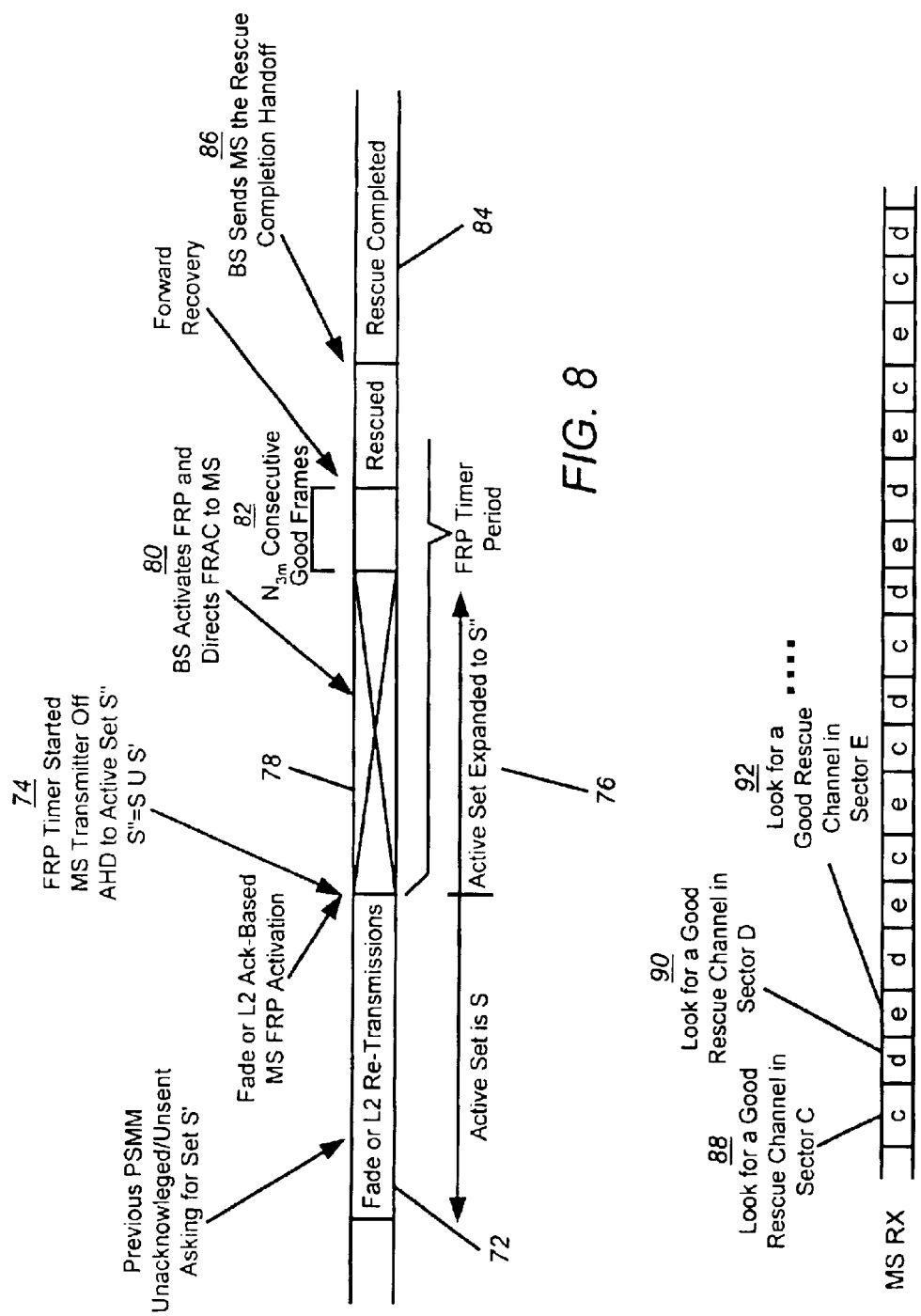

FORWARD-LINK RESCUE SYNCHRONIZATION METHOD AND APPARATUS

CROSS-REFERENCE TO RELATED APPLICATIONS

Embodiments of the present invention claim priority from U.S. provisional patent application Ser. No. 60/257,207 entitled "Forward-Link Rescue Synchronization Method," filed Dec. 20, 2000, and are related to U.S. utility application Ser. No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to a method and apparatus for synchronizing network forward-link transmitters and mobile station receivers during a connection rescue procedure.

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because a cell site can be omni or sectorized, it should be understood that the terms BS and sector are used herein somewhat interchangeably. The forward and reverse links utilize a number of forward and reverse channels. For example, the BS 26 communicates with the MSs using a plurality of forward common channels or links which may include, but are not limited to, one or more pilot channels, a sync channel, and one or more paging channels, discussed in greater detail below. These channels are referred to as common channels because the BS 26 may communicate those channels to all MSs in the network. Generally, these common channels are not used to carry data, but are used to broadcast and deliver common information.

Each sector within BS 26 broadcasts a pilot channel that identifies that sector and is simple for a MS 24 to decode. Both sectors and pilot channels are distinguished by pseudonoise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel,-the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 26 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to a specific MS 24, and the channels may carry data.

The reverse channels or links may include an access channel and one or more reverse traffic channels and control channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of MSs to communicate with one or more BSs in neighboring cell sites, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time.

When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS. However, noise and interference in the field may require error correction to determine what was actually transmitted.

The CDMA wireless communication system is fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95A, published in 1993; TIA/EIA-95B, published Feb. 1, 1999; TIA/EIA/IS-2000, Volumes 1–5, Release A, published Mar. 1, 2000; TIA/EIA-98D, published Jun. 1, 2001; and WCDMA standards 3GPP TS 25.214 V4.2.0 published September 2001, TS25.401 V5.1.0 published September 2001, TS 25.331 V4.2.0 published Oct. 8, 2001, and TR 25.922 V4.1.0 published Oct. 2, 2001.

As described above with reference to an example CDMA system, orthogonal codes may be used to code a particular channel. For example, the simple-to-decode pilot channel described above may use a fixed, known code such as the all one coded $W_0$ Walsh code. Similarly, the sync channel may use the alternating polarity $W_{32}$ Walsh code. In addition to the orthogonal codes used to define channels such as traffic channels, for example, privacy scrambling may also be added such that a MS can only read the data on the traffic channel that it can unscramble. This privacy scrambling may be accomplished by the use of a mask in conjunction with the orthogonal code.

Each MS groups the BS sectors into various sets, which may include, but is not limited to, an active set, a neighbor set, a candidate set, and a remaining set, discussed in further detail below.

The MS active set contains the PN offset identifiers of pilots corresponding to the BS sectors that are communicating with the MS at any point in time. However, it should be noted that for purposes of simplifying the description herein, the MS active set may be identified as containing "pilots." Thus, when a MS is idle, but monitoring a single BS for pages and overhead updates, the active set for that MS will contain that BS pilot's PN offset identifier as its only member. There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined through maximum ratio combining or other similar combining algorithms, the data from a strong channel may be weighted more heavily than data from a weak channel, which is likely to have more errors. Thus, the data with a higher likelihood of being correct is given higher weight in generating the final result.

When a MS is idle, a neighbor list which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

Handoffs

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value" for handoffs (T_ADD), which can be a static value or dynamic value as described in the standards. The neighboring pilot channel information, known in the art as a Neighbor Set, may be communicated to the MS through network infrastructure entities including BS controllers (BSC) 40 that may control a cell cluster 42, and communicates with a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes pilots having a signal strength greater than T_ADD from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a new BS or network active set according to the received PSMM, and may notify the MS 36 of the new active set via an HDM. It should be noted, however, that the new active set may not always exactly comply with the MS's request, because the network may have BS resource considerations to deal with.

The MS 36 may maintain communication with all the BSs and BS sectors that are included in the new Active set. When the active set contains more than one BS, the MS is said to be in soft handoff with those BSs. When the active set contains more than one sector originating from the same BS, the MS is in softer handoff with those sectors.

The MS 36 typically maintains communications with all the BSs and BS sectors in the active set so long as the pilots for each BS are stronger than a "pilot drop threshold value" for handoffs (T_DROP). When one of the pilots weakens to less than T_DROP for a time exceeding T_TDROP (a time limit which prevents pilots with temporary dips in signal strength from being dropped), the MS 36 notifies the BSs of the change through a PSMM. The network may then determine a new active set that will typically not include the BS or sector whose pilot was reported to have degraded below T_DROP for a duration of T_TDROP, and notify the MS 36 of that new active set. Upon notification by the network, the MS 36 then demotes the weakened pilot to the Neighbor Set. This mechanism enables soft and softer handoffs. Note that most of the parameters used in the soft handoff process, such as T_ADD and T_DROP, are determined or at least limited by the network.

Soft handoff allows a MS to maintain communication with one or more BSs (sectors) simultaneously while the condition of any one of these links is not sufficient to allow successful communication through a single link. This also happens when the MS is moving away from a region served by one BS (sector) into a region that is served by a different BS (sector), to avoid any interruption in the communication between the MS and switching center.

It is typical for a MS 36 to be starting a handoff or in the process of handoff when connections fail and are dropped. This is expected because poor coverage or weak signal environments generally exist near cell boundaries, in areas where the signal to interference ratios change abruptly, in areas of pilot pollution, or areas significantly affected by cell breathing, capacity limitations, network resource availability, and network coverage, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$ (=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Other frame sizes such as 5 ms, 10 ms and multiples of 20 ms can also be used. Preambles with various lengths can be transmitted prior to the data frames, for example, in case of reverse access channels and reverse common control channels. It should be understood that the content of the frames 64 can differ. One frame may contain pilot, signaling and data multiplexed on different code channels, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

In a practical communications network, it is neither realistic nor desirable to target an error rate of zero percent (i.e., all frames received properly). Rather, a frame error rate of one percent, for example, is targeted. Power control loops can be used to maintain a desirable frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power, reduce interference, and allow the frame error rate to move up to one percent. The BS may therefore continuously instruct the MS, through power control bits in predetermined locations within a frame, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel, through similar power control loops. Thus, both the BS and the MS may continuously provide each other feedback in order to change the other's power levels. However, depending on its resource management such as channel power allocation limits, the BS may not necessarily change its transmitter power levels based on the feedback from the MS.

Despite the aforementioned power control loop, error rates may not be controllable to about one percent as a MS, which has limited transmitter power, moves about in a cellular network and experiences variations in signal strength and signal quality due to physical impediments, interference from adjacent channels, and positions near the edges of sectors. As the error rates rise to intolerable levels, dropped connections become a problem.

Rescue Procedures

Rescue procedures based on the reverse link or restarting the connection have previously been proposed. Generally, a rescue of a failing connection is possible if there is a sector (pilot) that would be capable of sustaining the connection if the failing MS had that pilot in its active set. Rescue procedures attempt to add these missing pilots to the MS and network active sets. Essentially, the MS adds pilots autonomously to its active set and, in the case of reverse-link initiated rescues, uses the updated active set to transmit a reverse rescue channel that is typically reserved (dedicated) and pre-arranged in advance. The network may also update its active set and transmit a forward rescue channel, also pre-arranged in advance so that the MS is able to detect such transmission. Typically, a channel assignment or handoff message may be used to complete the rescue by formally assigning the MS to a new active set that is synchronized with the network's active set.

Reverse-link-based rescue methodologies include common and dedicated channel methods. In a typical reverse based rescue procedure, the MS transmits a rescue channel, either on a common or dedicated channel, while the communications network utilizes one or more sectors in an attempt to demodulate the rescue channel.

Forward based rescue procedures have also been proposed. One such forward based rescue procedure is disclosed in U.S. utility application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data connections, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal frames for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. Although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM(s) that it has sent (whether or not the PSMM was actually sent, successfully sent, or acknowledged). In other words, the MS promotes pilots to the active set autonomously without a handoff direction (i.e. the new active set is the union of the old active set and the autonomously promoted active pilots: S"=S U S') (see reference character 76). The MS then begins to cycle through this new active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on the forward based rescue procedure, see U.S. utility application Ser. No. 09/978,974 entitled "Forward Link Based Rescue Channel Method and Apparatus for Telecommunication Systems," filed Oct. 16, 2001.

Whether a rescue procedure is reverse or forward based, in either case a rescue channel must be transmitted from the network and received by the failing BS. In other words, during the execution of a rescue procedure, a rescue channel must be communicated over the forward link. Prior to establishing this link, the failing MS autonomously adds pilots to update its active set, and attempts to receive a rescue channel from one or more of the sectors/BSs in the updated active set. To update its active set, the MS may review the most recently transmitted PSMM and/or previous PSMMs and add (promote) to its active set all pilots in the PSMM(s) that were designated to be promoted to, or maintained in, its active set. In addition, the MS may continuously monitor pilot conditions and update its active set with new BSs/sectors according to pilot signal strengths, for example. The MS may optionally transmit a new PSMM message each time the MS changes its active set. Where a forward rescue procedure is employed, this may require that the MS turn on its transmitter for a time sufficient to transmit the PSMM.

After the MS has updated its active set, the rescue procedure may select or otherwise assign to the MS one or more rescue channels that the MS will attempt to receive from the sectors/BSs identified by the pilots in the updated active set. There are a number of ways for identifying the rescue channel(s). For example, the rescue channel(s) could be identified using orthogonal codes that are predetermined, or specified in overhead messages, neighbor lists, parameters message, dedicated messages or orders. Alternatively, the orthogonal codes can be pre-arranged to be a hash of a MS Electronic Serial Number (ESN) or other parameters and BS parameter(s) in order to pseudo-randomly distribute the rescue channels among failing MSs.

After the rescue channels are determined, the MS then attempts to demodulate a rescue channel from the sectors/BSs identified in its updated active set by configuring one or more rake fingers to demodulate a particular rescue channel from a particular sector/BS.

While the MS is attempting to demodulate a rescue channel from the sectors/BSs identified in the updated active set, the network may also update a network active set associated with the failing MS. As previously described, during rescue the MS may send a new PSMM message each time the MS has changed its active set. If a PSMM is received by the network, the network may review the received PSMM and update the network active set to include all pilots in the PSMM that were designated to be promoted to, or maintained in, the MS's active set.

If no PSMM is received from the MS, a subset of neighbor BSs can be selected to be added to the updated network active set. The network may store the last active set communicated by the failing MS prior to the start of rescue, and using this active set as a starting point to define a network active set associated with the failing MS, can determine additional BSs/sectors to add to the network active set in order to rescue the connection. These BSs or sectors to be added to the network active set may be dependent on a number of factors including, but not limited to, the location of the MS, the sectors closest to the MS, the previous active sets for that MS, other history and statistics of the MS, and what new sectors/BSs the MS was asking for in its last transmitted PSMM. Additionally, in the case where a reverse rescue procedure is employed, the network may monitor MS transmissions or the MS's location and update the network active set with new BSs/sectors accordingly.

After the updated network active set associated with the failing MS has been determined, one or more rescue channels to be transmitted by the sectors/BSs identified in the updated network active set must be determined. There are a number of ways for identifying the rescue channel(s) to be transmitted by the network. The rescue channel(s) could be identified using predetermined orthogonal codes. Alternatively, the network processor(s) may first compute or otherwise determine the orthogonal codes used to identify the rescue channel(s). For example, a hash of a MS Electronic Serial Number (ESN) or other parameters and BS parameter(s) may be employed in order to pseudo-randomly distribute the rescue channels among failing MSs. In addition, the network may continuously monitor conditions or the MS's location and identify new sectors/BSs on new applicable sectors to the MS.

Once the updated network active set and rescue channel(s) have been determined, one or more sectors/BSs in the updated network active set will then transmit the forward link for the MS using one or more of the associated (agreed upon) rescue channel(s). In other words, additional channels, not available to the MS when its connection was first failing, are now made available for the MS to soft-handoff with.

If the MS is able to demodulate a rescue channel from one or more of the sectors/BSs transmitting the rescue channel and receive a predetermined number of consecutive good frames of the rescue channel, then the MS enables its transmitter and continues the connection, thereby completing a successful rescue. If the MS does not receive the predetermined number of consecutive good frames of the rescue channel before a rescue procedure timer expires, then the MS terminates (drops) the connection.

The speed of rescue is dependent on how quickly the network and MS can synchronize the transmission and reception of the rescue channel. Therefore, a need exists for a method and apparatus that efficiently synchronizes the transmission and reception of the rescue channel from the network and the failing MS, respectively, to communicate the rescue channel to the failing MS and rescue the connection.

SUMMARY OF THE INVENTION

Whether a rescue procedure is reverse or forward based, in either case a rescue channel must be transmitted from the network and received by the failing MS. In other words, during the execution of a rescue procedure, a rescue channel must be communicated over the forward link. Prior to establishing this link, the failing MS autonomously adds pilots to update its active set, determines one or more rescue channels to be monitored, and attempts to demodulate a rescue channel from the sectors/BSs identified in its updated active set by configuring one or more rake fingers to demodulate a particular rescue channel from a particular sector/BS. Additionally, prior to the communication of a rescue channel over the forward link, the network must autonomously add sectors/BSs to update a network active set, and determine a rescue channel to be used in the rescue. Once the updated network active set and rescue channel have been determined, one or more sectors/BSs in the updated network active set will then transmit the rescue channel.

If the MS is able to demodulate a rescue channel from one or more of the sectors/BSs transmitting rescue channels, and receive a predetermined number of consecutive good frames of the rescue channel, then the MS enables its transmitter and continues the connection, thereby completing a successful rescue. Note, however, that in order to efficiently rescue a connection, the MS and network described above must be coordinated to achieve, in an optimal time, a condition in which the MS is attempting to receive a rescue channel from a sector/BS that is transmitting the rescue channel at that time. Furthermore, in order to efficiently rescue a connection, the MS should not be attempting to receive a rescue channel from a sector/BS that is not transmitting the rescue channel at that time.

The present invention efficiently synchronizes the transmission from the network and reception of the rescue channel at the failing MS, respectively, to communicate the rescue channel to the failing MS and rescue the connection. A cycling through of BSs by the MS and the network is preferably coordinated according to a certain set of strategies to guarantee some transmission overlap for at least a predetermined number of frames, and therefore permit synchronization. "Coordination," as referred to herein, does not suggest communications between the MS and network during execution of a rescue procedure. Rather, coordination refers to the execution of rescue channel transmission strategies by the network in conjunction with the execution of rescue channel search strategies by the MS to maximize the chance that that MS will receive a good rescue channel from the network. The order in which the MS sequentially cycles through the BSs in its updated active set is based on the probability that a particular BS is transmitting a receivable rescue channel. The MS may prioritize the BSs in its updated active set according to pilot signal strength, history of handoffs, PSMM information, and location of the MS. Additionally, the order in which the network sequentially cycles through the BSs in its updated network active set may be based on the probability that a particular MS will be able to receive a good rescue channel, based upon previously received PSMMs or other signal strength information. A good rescue channel is a rescue channel that can be received by the MS and is characterized by a frame quality threshold typically defined as a time and quality criteria (i.e. N consecutive good frames or 1% frame error rate over 100 frames).

To improve the efficiency of rescue, in embodiments of the present invention the MS can execute a more sophisticated detection scheme to determine which BSs are actually transmitting a good rescue channel. This scheme includes a combined detection component and a learning progression component.

In the combined detection component, the MS will configure its rake receiver fingers in an attempt to receive the rescue channel from up to two or more BSs at a time. If the rescue channel is successfully received, at least in part, the MS de-assigns the fingers assigned to one of the BSs, and attempts to receive the rescue channel from the remaining BS. The quality of the received signal within the next frame will provide the answer. If the received signal is a good rescue channel, then the BS(s) that the remaining fingers are assigned to are the rescuing BS(s). Otherwise, if a good rescue channel is not received, it is most likely that the BS that was de-assigned is the receivable BS and the MS should assign fingers only to paths from that rescuing sector. This approach can be generalized to a weighted binary search of N BSs within a single SUPER_ATTEMPT time interval, wherein the N BSs most likely to be transmitting the rescue channel are given the highest priority for detection. The individual weights are a combination of relative inputs, which may include, but are not limited to, pilot strength, history of handoffs, pilots that were listed as "keep" or not (or never even transmitted) in Pilot Strength Measurement reports, and locations of BSs relative to the MS.

The decisions and actions taken by the MS to determine the BS transmitting the rescue channel can be represented by trees. As these trees are traversed, the de-assignments and demodulation attempts that take place at each node within the tree benefit from knowledge obtained from the subsequent node—a learning progression. These trees can be extended to cover any set of N BSs, and as the number N increases, the size and complexity of the trees may increase. Some trees may enable the MS to make its determination in fewer frames than other trees. The present invention maximizes the successful detection speed by selecting and using the tree with the fastest search sequence using exhaustive techniques, dynamic programming, or memo-ization.

These and other features and advantages of embodiments of the present invention will be apparent to those skilled in the art from the following detailed description of embodiments of the invention, when read with the drawings and appended claims.

BRIEF DESCRIPTION OF THE DRAWINGS

FIG. 8 is a timeline of one embodiment of the Forward Rescue Procedure when it is activated.

FIG. 9 is a timeline illustrating an example MS rake receiver configured for receiving a rescue channel from only one sector/BS in its updated active set at any time during the execution of a rescue procedure.

DETAILED DESCRIPTION OF PREFERRED EMBODIMENTS

Figure 1:
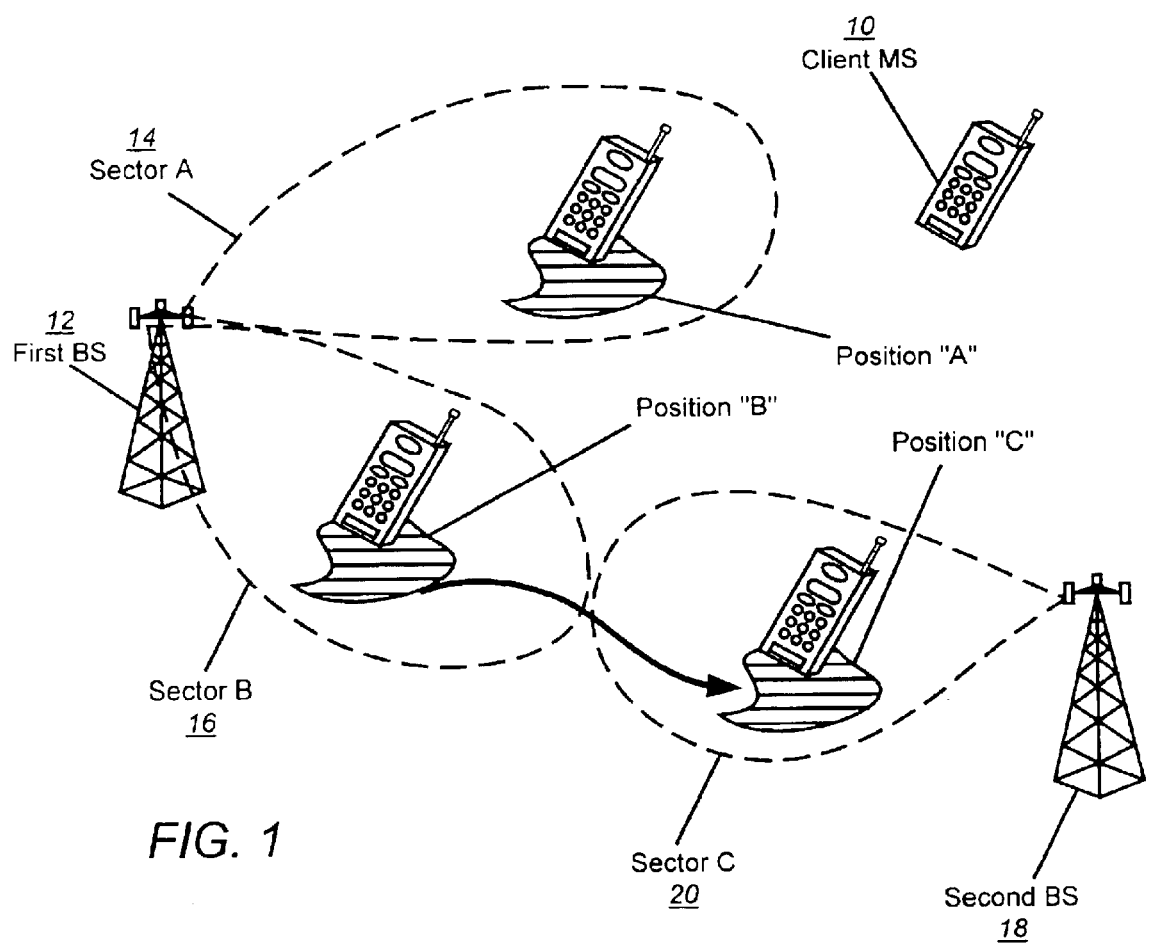
FIG. 1 illustrates a roving mobile station moving amongst different locations between sectors in a wireless communication system.
Figure 2:
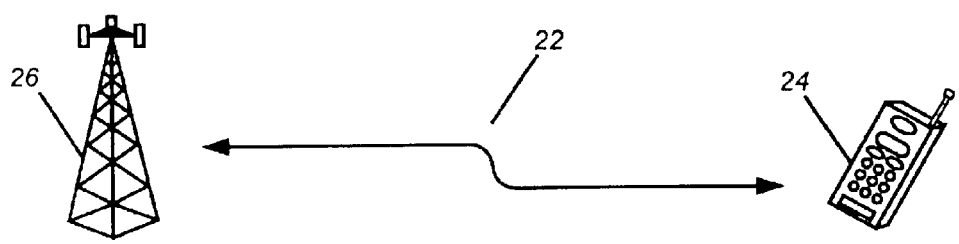
FIG. 2 illustrates an exemplary communication link between a mobile station and a base station in a wireless communication system.
Figure 3:
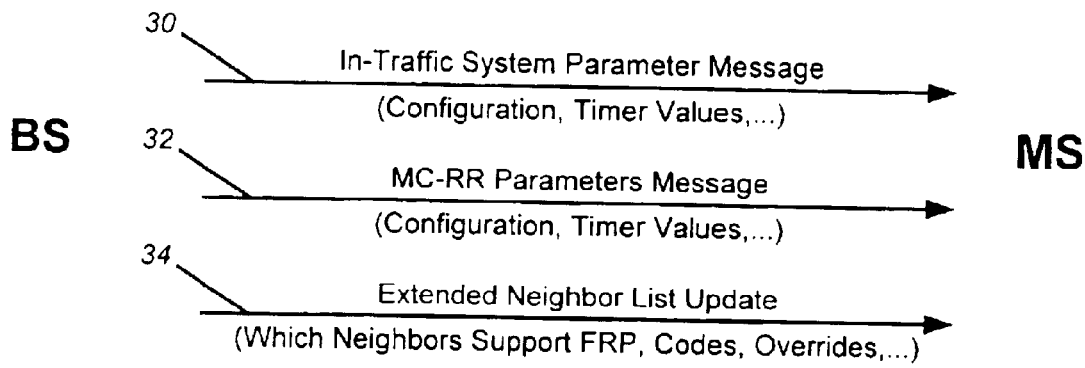
FIG. 3 illustrates overhead messages communicated from a base station to a mobile station in a wireless communication system.
Figure 5:
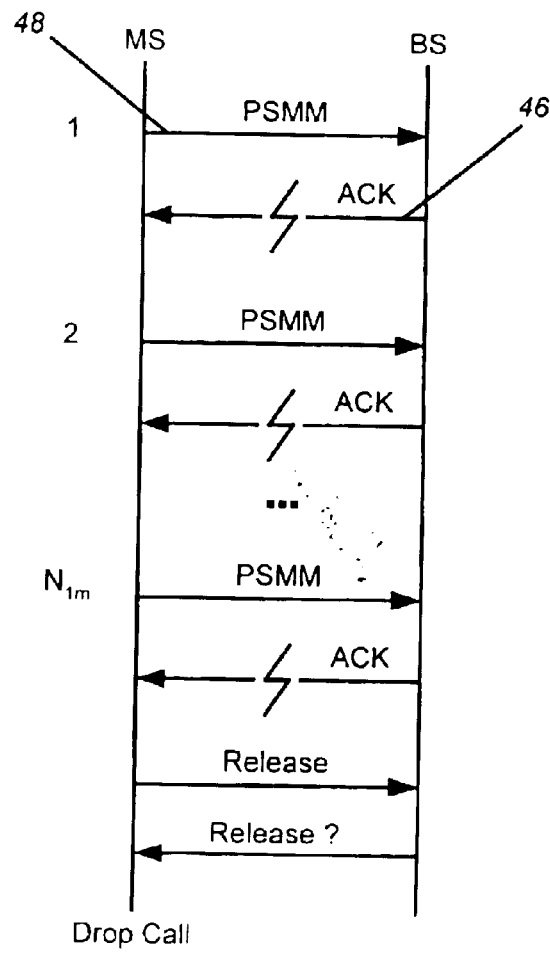
FIG. 5 is a message sequence between a mobile station and a base station resulting in a dropped connection due to Layer 2 Acknowledgement failure.
Figure 4:
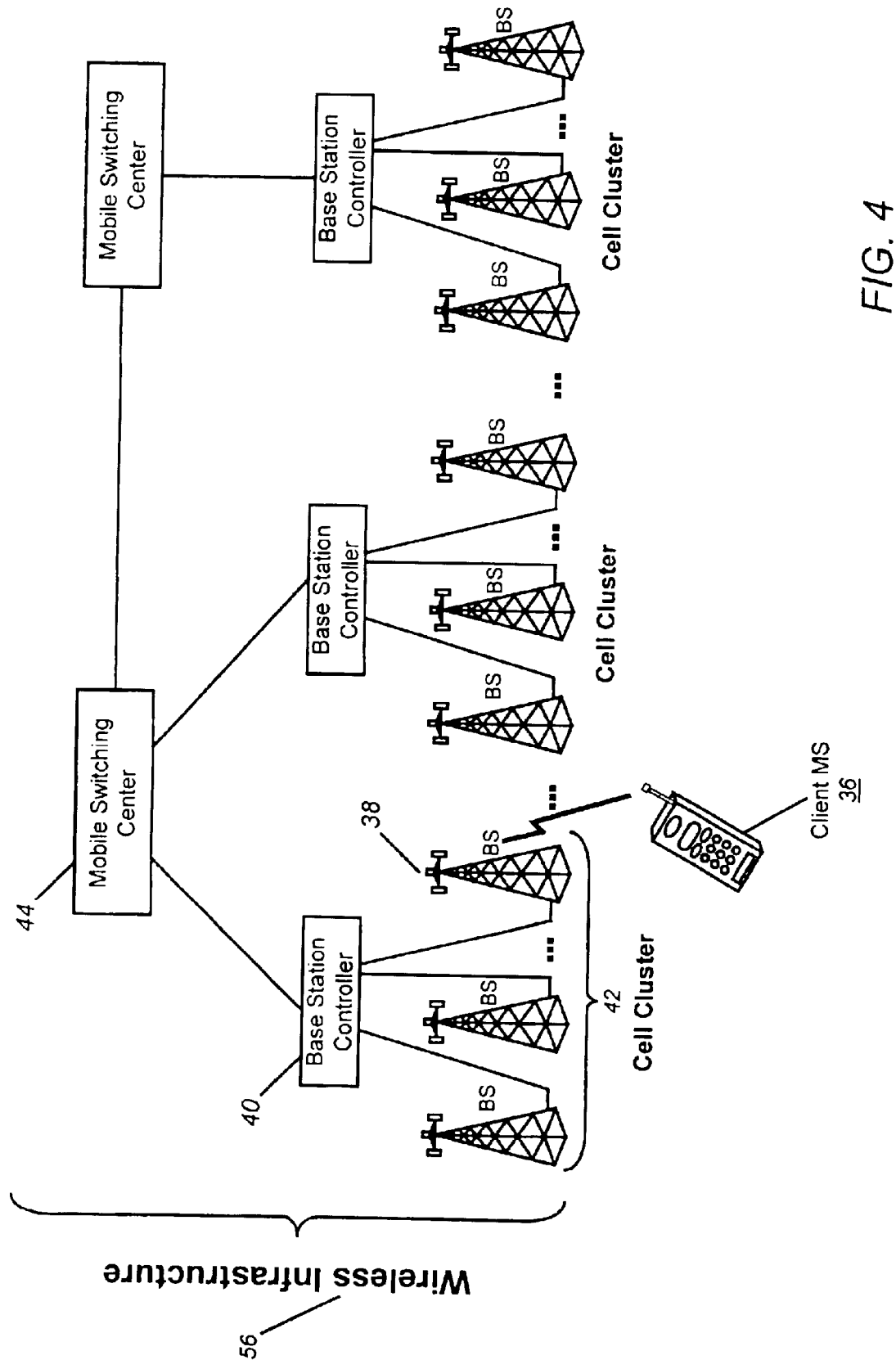
FIG. 4 illustrates a wireless communication infrastructure in communication with a roving mobile station.
Figure 6:
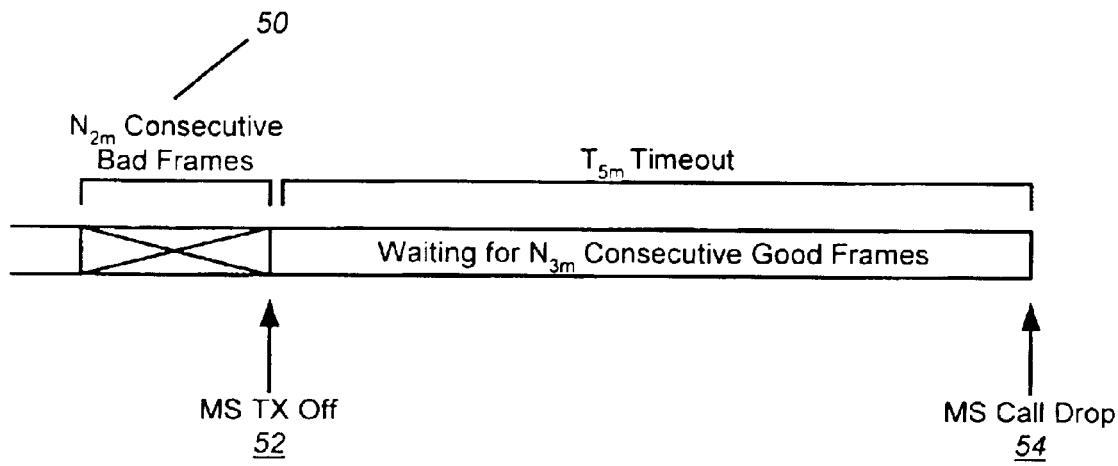
FIG. 6 is a timeline that is representative of a dropped connection resulting from fading of the forward link in a wireless telecommunications network.
Figure 7:
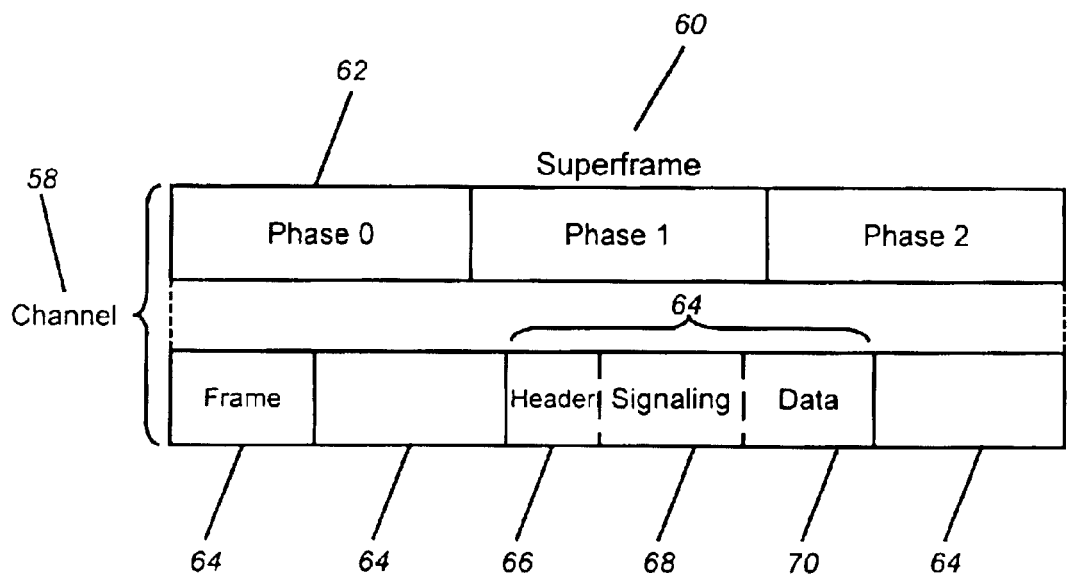
FIG. 7 is a timeline of a superframe, divided into three phases and four frames, for use in a wireless telecommunications network.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may reference the CDMA communication protocol (code-based protocols) for purposes of explanation only, embodiments of the present invention are applicable to other communication protocols and digital radio technologies generally, and include, but are not limited to, CDMA, TDMA, FDMA, GSM, GPRS, and the like.

Whether a rescue procedure is reverse or forward based, in either case a rescue channel must be transmitted from the network and received by the failing MS. In other words, during the execution of a rescue procedure, a rescue channel must be communicated over the forward link. Prior to establishing this link, the failing MS autonomously adds pilots to update its active set, determines one or more rescue channels to be monitored, and attempts to demodulate a rescue channel from the sectors/BSs identified in its updated active set by configuring one or more rake fingers to each demodulate a particular rescue channel from a particular sector/BS.

In a simple example illustrated in FIG. 9, the MS rake receiver is configured for receiving a good rescue channel from only one sector/BS in its updated active set at any time. The MS rake receiver is reconfigured every SUB_ATTEMPT time interval to attempt to receive a good rescue channel from another sector/BS in its updated active set. In the example of FIG. 9, Sectors C, D and E are the only sectors that are part of the updated active set, and thus the MS cycles through these sectors looking for a good rescue channel (see reference characters 88, 90, and 92).

Although not shown in FIG. 9, the MS may also configure its rake receiver fingers for receiving a good rescue channel from several sectors/BSs in its active set at any time, depending on its rake receiver capability. Again, the MS rake receiver may be reconfigured every SUB_ATTEMPT time interval to receive a good rescue channel from another set of sectors/BSs in its updated active set.

Additionally, prior to the communication of a rescue channel over the forward link, the network must autonomously add sectors/BSs to update a network active set, and determine a rescue channel to be used in the rescue. Once the updated network active set and rescue channel have been determined, one or more sectors/BSs in the updated network active set may then sequentially transmit the rescue channel during a synchronization period, which is the time during which the MS is determining which BSs are transmitting the rescue channel. Alternatively, all selected BSs may transmit the rescue channel, without a specific distinction between a rescue synchronization period and the remainder of the rescue period.

Figure 10:
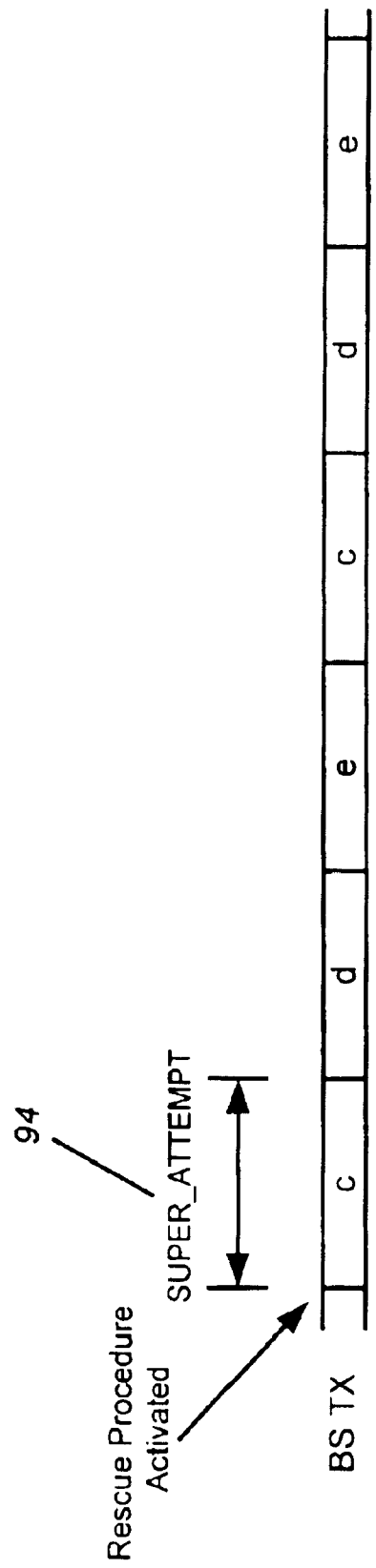
FIG. 10 is a timeline illustrating an example network transmitting a rescue channel from only one sector/BS in its updated network active set at any time during the execution of a rescue procedure.

In a simple example illustrated in FIG. 10, the network transmits a rescue channel from only one sector/BS in its updated network active set at any one time. The network is reconfigured every SUPER_ATTEMPT time interval 94 to transmit a rescue channel from another sector/BS in its updated network active set. In the example of FIG. 10, sectors C, D and E are the only sectors that are part of the updated network active set, and thus the network cycles through these sectors while transmitting a good rescue channel.

If the MS is able to demodulate a rescue channel from one or more of the sectors/BSs transmitting the rescue channel, and receive a predetermined number of consecutive good frames of the rescue channel, then the MS enables its transmitter and continues the connection, thereby completing a successful rescue. Note, however, that in order to efficiently rescue a connection, the MS efforts exemplified in FIG. 9 and the network efforts exemplified in FIG. 10 must be coordinated to achieve, in an optimal time, a condition in which the MS is attempting to receive a rescue channel from a sector/BS that is transmitting the rescue channel a that time.

Embodiments of the present invention provide a method and apparatus that efficiently synchronizes the transmission from the network and reception of the rescue channel at the failing MS, respectively, to communicate the rescue channel to the failing MS and rescue the connection.

Figure 11:
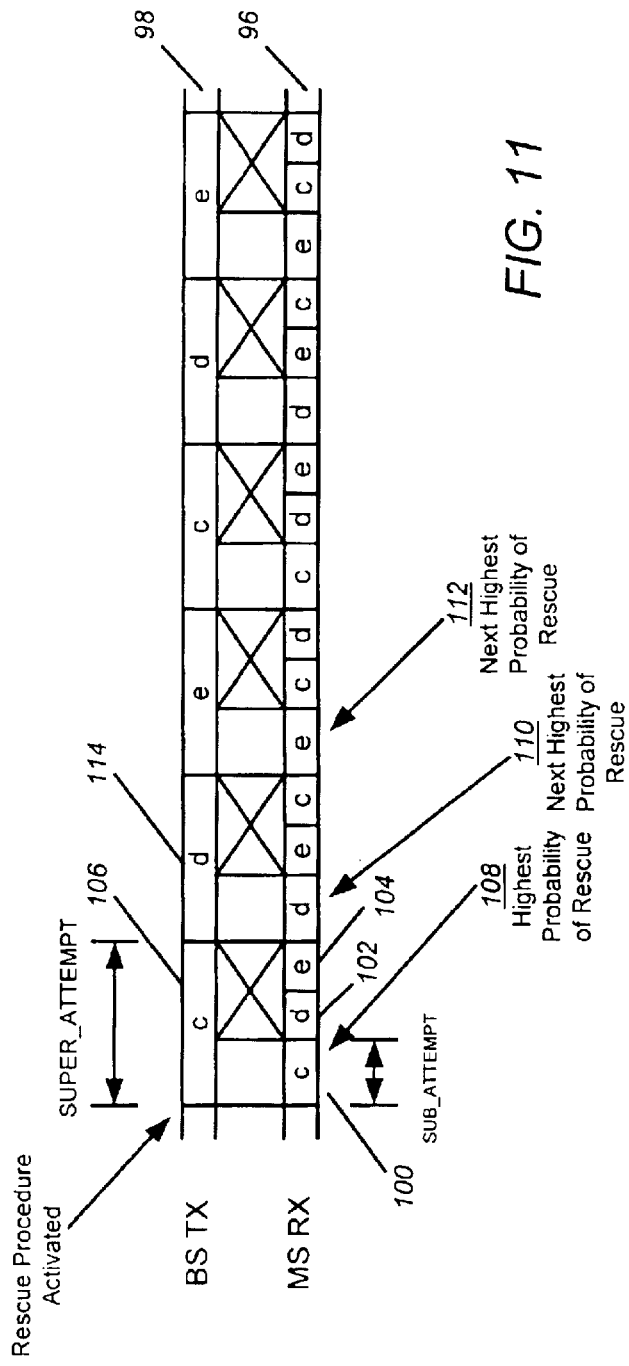
FIG. 11 illustrates an example of the synchronization of BS transmission and MS reception of the rescue channel according to an embodiment of the present invention.

FIG. 11 illustrates an example of the synchronization of BS transmission and MS reception of the rescue channel according to an embodiment of the present invention. In the example of FIG. 11, the MS sequentially cycles through BSs C, D, and E in its updated active set (see reference character 96) at each SUB_ATTEMPT time interval, searching for a rescue channel from those BSs. At the same time, the network sequentially cycles through the BSs C, D, and E in its updated network active set (see reference character 98) at each SUPER_ATTEMPT time interval, transmitting the rescue channel from those BSs. Note that although the text and figures described herein may show only one BS transmitting the rescue channel at any one time for purposes of simplifying the disclosure, it should be understood that in other embodiments of the present invention, multiple BSs may transmit the rescue channel simultaneously. However, transmitting the rescue channel from only one BS at a time serves to conserve scarce channel resources. In addition, transmitting the rescue channel from only one BS at a time may assist in faster synchronization, because if two or more BSs are transmitting the rescue channel simultaneously and a good rescue channel is received by the MS, it may be difficult for the MS to determine which BSs are transmitting the rescue channel, and which BSs are not.

The cycling through of BSs by the MS and the network is preferably coordinated according to a certain set of strategies to guarantee some transmission overlap for at least a predetermined number of frames, and therefore permit a rescue. At this time of transmission overlap, the MS will be attempting to demodulate the rescue channel from a particular BS at the same time that the network is transmitting the rescue channel from that sector. Note that in the first SUB_ATTEMPT time interval 100, BS C is transmitting the rescue channel at the same time that the MS is attempting to receive the rescue channel from BS C, and therefore it may be possible for the MS may receive a good rescue channel at that time. However, if BS C is not an optimal BS for transmission of the rescue channel to the MS, the MS may not receive a good rescue channel in the first SUB_ATTEMPT time interval, or may receive only part of the information from the rescue channel. During the second and third SUB_ATTEMPT time intervals 102 and 104, when the MS is attempting to receive the rescue channel from BSs D and E, respectively, the MS cannot receive a good rescue channel. If a good rescue channel is not received in the first SUPER_ATTEMPT time interval 106, the MS may continue to attempt to receive the rescue channel from additional BSs during subsequent SUPER_ATTEMPT time intervals.

In one embodiment of the present invention illustrated in FIG. 11, the order in which the MS sequentially cycles through the BSs in its updated active set is based on the probability that a particular BS is transmitting a good rescue channel. The MS may prioritize the BSs in its updated active set by applying ordering criteria according to pilot signal strength, history of handoffs, PSMM information, and location of the MS. The probability value each for BS in the MS's updated active set may be maintained in an array that is updated as the previously described information changes. In FIG. 11, BSs C, D, and E are what the MS predicts to be the $1^{st}$, $2^{nd}$, and $3^{rd}$ most likely BSs to be transmitting, respectively (see reference characters 108, 110, and 112), and thus the MS first attempts to receive the rescue channel from the BSs in that order (i.e. C, D, and E) within the first SUPER_ATTEMPT time interval 106. Note that the MS is attempting to detect only one sector at a time. If the first SUPER_ATTEMPT time interval 106 passes without a successful rescue, at each successive SUPER_ATTEMPT time interval, the order in which the MS attempts to receive a rescue channel is changed such that the previous highest priority BS becomes the lowest. In the example of FIG. 11, in the second SUPER_ATTEMPT time interval 114, BS C is put to the end of the priority list, and the next highest priority BS, D, is the first BS tried in the second SUPER_ATTEMPT time interval, such that the order becomes D, E, and C.

Additionally, the order in which the network sequentially cycles through the BSs in its updated network active set may be based on the probability that a particular MS will be able to receive a good rescue channel, based upon previously received PSMMs or other signal strength information. In FIG. 11, BSs C, D, and E are what the network predicts to be the $1^{st}$, $2^{nd}$, and $3^{rd}$ most likely BSs receivable by the MS, respectively, and thus the network will transmit the rescue channel from BSs C, D, and E, in sequence, and then optionally repeat that pattern.

If, as illustrated in FIG. 11, the network's priorities are the same as the MS's priorities, this creates the highest probability that the connection will be rescued in the shortest period of time (the first SUB_ATTEMPT time interval). Because the pattern DEC is used in the second SUPER_ATTEMPT time interval, a rescue using BS D may occur in the fourth SUB_ATTEMPT period, but if the same CDE pattern is maintained during each SUPER_ATTEMPT time interval (another embodiment of the present invention), then a rescue using BS D could not occur until the fifth SUB_ATTEMPT period. In yet another embodiment, rather than simply rearranging the MS's priority list during each SUPER_ATTEMPT time interval, the MS may use pilot signal strength information monitored during the current (most recent) SUPER_ATTEMPT time interval to determine a new priority list for the next SUPER_ATTEMPT time interval.

Figure 12:
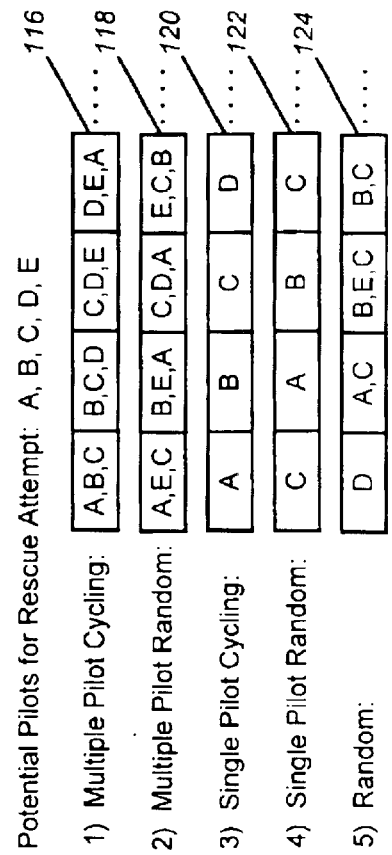
FIG. 12 illustrates some exemplary alternative strategies for BS demodulation and transmission by the MS and BS, respectively, during the rescue procedure period, according to embodiments of the present invention.

FIG. 12 illustrates some exemplary alternative strategies for BS demodulation and transmission by the MS and BS, respectively, during the rescue procedure period, according to embodiments of the present invention. This list is intended to be exemplary, not exhaustive. In multiple pilot cycling 116, a subset of BSs in the MS's updated active set is cycled through in a particular order during each SUB_ATTEMPT period. In multiple pilot random cycling 118, a subset of BSs in the MS's updated active set is cycled through in a random order during each SUB_ATTEMPT period. In single pilot cycling 120, one BS in the MS's updated active set is monitored during each SUB_ATTEMPT period in a particular order. In single pilot random cycling 122, one BS in the MS's updated active set is monitored during each SUB_ATTEMPT period in a random order. In random cycling 124, during each SUB_ATTEMPT period, one or more randomly selected BSs are monitored in a random order. Note that similar cycling techniques may be used by the network to cycle through BSs at each SUPER_ATTEMPT time interval.

In one embodiment of the present invention, the time period SUPER_ATTEMPT is known by the MS through messaging prior to rescue so that the MS can partition out one or more SUB_ATTEMPT time intervals within the SUPER_ATTEMPT time interval, during which it will attempt to receive a rescue channel from one of the BSs in its updated active set. The timing of the SUPER_ATTEMPT time intervals may also be known so that the MS can synchronize the timing of its SUB_ATTEMPT time intervals with the network's SUPER_ATTEMPT time intervals. The MS may also attempt to receive a rescue channel from all BSs in its updated active set during one SUPER_ATTEMPT time interval, to increase the likelihood that synchronization of a BS transmission and MS reception of a rescue channel will occur.

In the example of FIG. 11, the MS attempts to receive the rescue channel from every BS in its updated active set, one BS at a time. If the MS and network priorities are correct and coordinated, rescue may occur efficiently, such as in the first SUB_ATTEMPT time interval. However, the MS and network priorities may not always be correct and coordinated. For example, in the first SUB_ATTEMPT time interval in FIG. 11, even though the MS may be attempting to receive a rescue channel from BS C, and BS C is actually transmitting the rescue channel, it is possible that BS C actually has a low probability of communicating a good rescue channel to the MS, and therefore the MS may not receive a good rescue channel from BS C.

Furthermore, even though the MS may have promoted certain BSs to its updated active set, some of those BSs may not be even transmitting a rescue channel. Using FIG. 11 as a worst case example, if BS E is actually the only BS that can communicate a good rescue channel to the MS, the rescue may not occur until the seventh SUB_ATTEMPT interval (when the MS is attempting to receive the rescue channel from BS E at the same time that BS E is transmitting the rescue channel).

To improve the efficiency of rescue, in embodiments of the present invention the MS can execute a more sophisticated detection scheme to determine which BSs are actually transmitting a good rescue channel. This scheme includes a combined detection step and a learning progression component.

Combined Detection Step

Typically, as shown in FIG. 11 and described above, a MS will only attempt to receive the rescue channel from one BS at a time, because if the MS attempts to receive the rescue channel from multiple BSs at the same time, and one or more of those BSs is not transmitting the rescue channel, the rake receiver fingers assigned to that BS may introduce rogue symbols and interference into the MS's symbol combiner and weaken the actual combined received rescue channel signal. Even if a good rescue channel or part of a rescue channel is received, because the MS's rake receiver combines outputs from all fingers, it is difficult to determine which fingers received the good frames. Because of this difficulty, the MS may assign its rake receiver fingers to only a single rescue channel and BS at one time, and thus if a good rescue channel is found, the MS will be able to determine which BS provided that good rescue channel.

Figure 13:
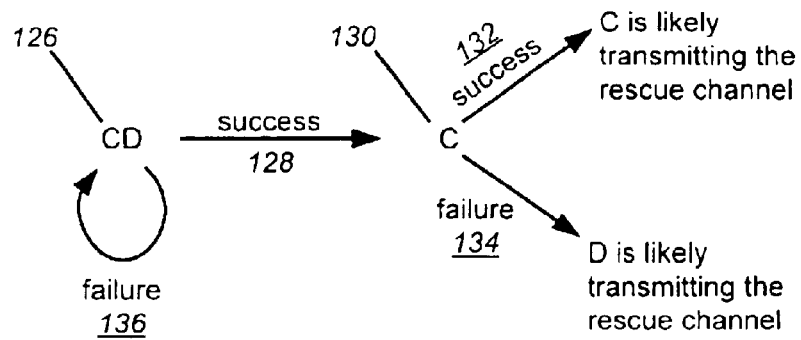
FIG. 13 is an exemplary flow diagram illustrating decisions and actions that may be taken by a MS implementing a combined detection step according to an embodiment of the present invention.

However, in one example embodiment of the present invention illustrated in FIG. 13, the MS will configure its rake receiver fingers in an attempt to receive the rescue channel from two BSs at a time (C and D, in the example of FIG. 13). (See reference character 126). The MS rake receiver configuration occurs on or before a frame boundary. Note that a SUB_ATTEMPT time interval typically contains one or more frames, with the SUB_ATTEMPT time interval boundaries being aligned with certain frame boundaries. If a good rescue channel frame is successfully received 128, the MS will still not know which BS was transmitting the rescue channel. (Herein, "success" refers to successful demodulation and CRC check of a frame.) Even if the pilot energies of the two BSs are known by the MS, it still does not know which of the two BSs transmitted the rescue channel, because traffic and pilot are separate channels. In order to figure out which BS is providing the good rescue channel, during a subsequent frame within the same SUPER_ATTEMPT period, the MS de-assigns the fingers assigned to one of the BSs (D, in the example of FIG. 13), and attempts to receive the rescue channel from the remaining BS (see reference character 130). The quality of the received signal within the next frame will provide the answer. If the received signal is a good rescue channel frame (see reference character 132), then the BS that the remaining fingers are assigned to (C, in the example of FIG. 13) is the receivable BS. Otherwise, if a good rescue channel frame is not received (see reference character 134), it is most likely that the BS that was de-assigned is the receivable BS and the MS should assign fingers only to paths from that rescuing sector.

If, on the other hand, during the initial combined detection attempt 126 a good rescue channel frame is not received, the combined detection attempt 126 may be re-tried during the next SUB_ATTEMPT time interval (see reference character 136), or the combined detection attempt may simply terminate. During subsequent SUPER_ATTEMPT time intervals, other pairs of BSs from the MS's updated active set may be selected, and the MS attempts to receive the rescue channel from both of those BSs simultaneously, and the process is repeated. The selection of a new set of BSs is similar to the selection process of the original set of BSs except that this process is repeated continuously or periodically in order to select the current set on the most recent conditions. Thus the selection of a new set of BSs may consider changing conditions (signal strengths) and failures or successes of the last SUPER_ATTEMPT. For example, if the MS determined that a rescue channel could not be obtained from BSs C and D in the last SUPER_ATTEMPT time interval, the probability values can be recomputed using that information, and as a result, a new set of BSs may be selected. In selecting the new pair of BSs, the MS may also consider the continuous change of BSs, wherein at the end of each SUPER_ATTEMPT time interval, the network switches to another BS. In the next SUPER_ATTEMPT time interval, the MS must tailor its search for what it expects the network to select as the next best BS to transmit on.

Figure 14:
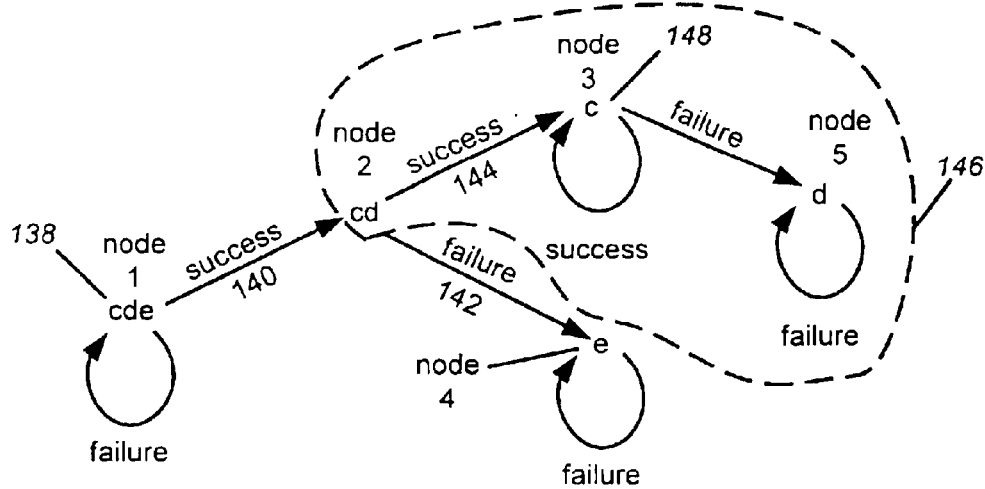
FIG. 14 is an exemplary flow diagram illustrating decisions and actions that may be taken by a MS implementing a combined detection step generalized to a weighted binary search of N BSs within a single SUPER_ATTEMPT time interval, wherein the N BSs most likely to be transmitting the rescue channel are given the highest priority for detection according to an embodiment of the present invention.

This approach can be generalized to a weighted binary search of N BSs within a single SUPER_ATTEMPT time interval, wherein the N BSs most likely to be transmitting the rescue channel are given the highest priority for detection. The individual weights are a combination of relative inputs, which may include, but are not limited to, pilot strength, history of handoffs, pilots that were listed as "keep" or not in Pilot Strength Measurement reports, and locations of BSs relative to the MS. In the example of FIG. 14, the MS assigns its rake receiver fingers in an attempt to receive the rescue channel from BSs C, D, and E simultaneously (see reference character 138). If a good rescue channel frame is received 140, then the finger associated with the BS most likely to be transmitting the rescue channel is de-assigned (BS E in the example of FIG. 14) in node 2. The quality of the received signal within the next frame may provide the answer. If a good rescue channel frame is not received 142, it is most likely that BS E is the receivable BS. If the received signal is a good rescue channel frame 144, then it is still unknown whether BS C or D is transmitting the rescue channel, and the two BS procedure described above can be employed to make the determination between C and D (see reference character 146). In the example of FIG. 14, the rake receiver fingers associated with BS D are de-assigned next (see reference character 148), because D was less likely than C to be transmitting a rescue channel. Note that each of the de-assignment and demodulation steps illustrated in FIG. 14 take place on a frame boundary, and all of the steps in FIG. 14 should take place within one SUPER_ATTEMPT time interval. It should also be understood that at the end of a SUPER_ATTEMPT time interval, no BS may have been identified.

Figure 15:
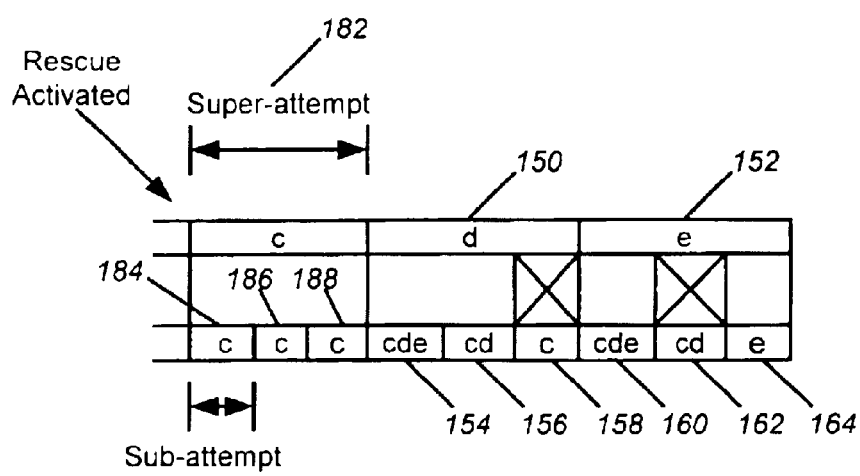
FIG. 15 is an exemplary timing diagram of the synchronization of BS transmission and MS reception of the rescue channel utilizing the combined detection techniques of FIGS. 14 and 16 according to an embodiment of the present invention.

Two examples of the search strategy of FIG. 14 are illustrated in the second and third SUPER_ATTEMPT periods of FIG. 15 (see reference characters 150 and 152, respectively). In the first SUB_ATTEMPT time interval 154 of the second SUPER_ATTEMPT period 150, when the network is transmitting the rescue channel from BS D, the MS searches BSs C, D and E simultaneously, and a good rescue channel frame is received. The MS then de-assigns the rake receiver fingers assigned to BS E (because of its higher priority), and in the second SUB_ATTEMPT time interval 156, the MS searches BSs C and D simultaneously, and a good rescue channel frame is again received. The MS then de-assigns the rake receiver fingers assigned to BS D, and in the third SUB_ATTEMPT time interval 158, the MS searches BS C, and a good rescue channel frame is not received. The MS therefore determines that it is likely that BS D is transmitting the rescue channel during the second SUPER_ATTEMPT period.

In the first SUB_ATTEMPT time interval 160 of the third SUPER_ATTEMPT period 152, when the network is transmitting the rescue channel from BS E, the MS searches BSs C, D and E simultaneously, and a good rescue channel frame is received. The MS then de-assigns the rake receiver fingers assigned to BS E (because of its higher priority), and in the second SUB__ATTEMPT time interval 162, the MS searches BSs C and D simultaneously, and a good rescue channel frame is not received. The MS then de-assigns the rake receiver fingers assigned to BSs C and D, re-assigns rake receiver fingers to BS E, and in the third SUB__ATTEMPT time interval 164, the MS searches BS E, and a good rescue channel frame is received. The MS therefore determines that it is likely that BS E is transmitting the rescue channel during the third SUPER__ATTEMPT period.

Figure 16:
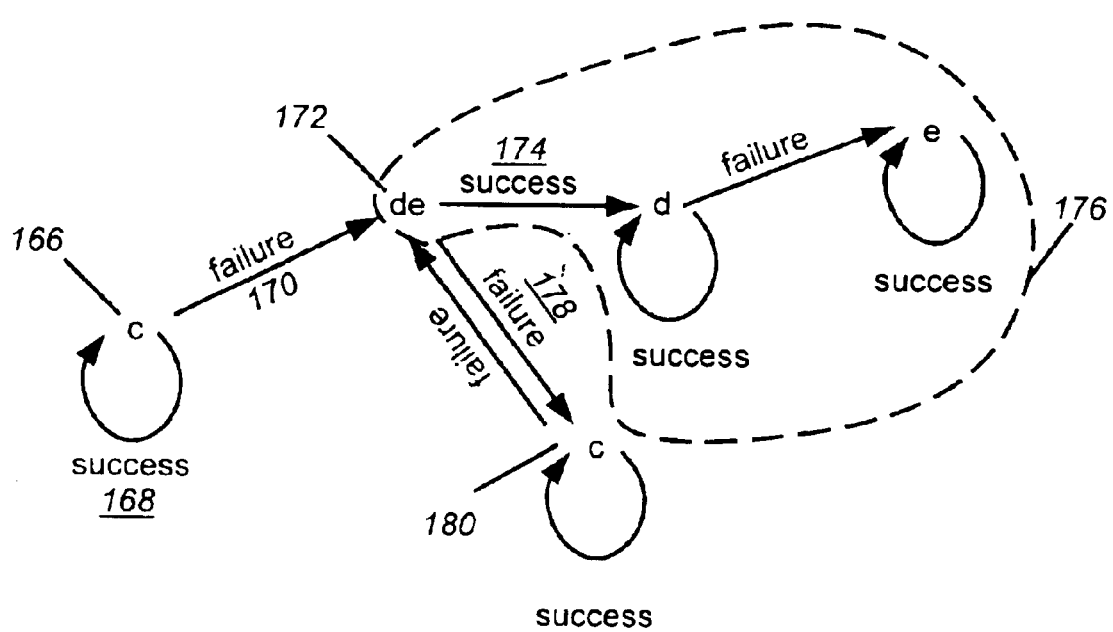
FIG. 16 is an exemplary flow diagram of a weighted binary search of N BSs within a single SUPER_ATTEMPT time interval, wherein the MS first attempts to receive the rescue channel from the highest probability BS alone, according to an embodiment of the present invention.

FIG. 16 illustrates another example of a weighted binary search of N BSs within a single SUPER__ATTEMPT time interval, wherein the MS first attempts to receive the rescue channel from the highest probability BS C alone (see reference character 166). If a good rescue channel frame is received, then the MS may continue to receive the rescue channel from BS C (see reference character 168), or the rescue may terminate at that time. However, if a good rescue channel frame is not received 170, then the next two highest probability BSs D and E may be tried together (see reference character 172). If the MS receives a good rescue channel frame 174, then it is still unknown whether BS D or E is transmitting the rescue channel, and the two BS procedure described above can be employed (see reference character 176) to make the determination between D and E. If a good rescue channel frame is not received 178, then because C still has the highest probability of being the BS transmitting the rescue channel, the MS may re-assign all of its rake receiver fingers to BS C, and essentially start the procedure again (see reference character 180). Note again that all of the steps in FIG. 16 should take place within one SUPER__ATTEMPT time interval.

One example of the search strategy of FIG. 16 is illustrated in the first SUPER__ATTEMPT period of FIG. 15 (see reference character 182). In the first SUB__ATTEMPT time interval 184 of the first SUPER__ATTEMPT period 182, when the network is transmitting the rescue channel from BS C, the MS searches BS C only, and a good rescue channel frame is received. Because node 1 of FIG. 16 loops on success, in the second SUB__ATTEMPT time interval 186 of the first SUPER__ATTEMPT period 182, the MS again searches BS C only, and again a good rescue channel frame is received. In the third SUB__ATTEMPT time interval 188, the MS again searches BS C, and a good rescue channel frame is again received. The MS therefore determines that it is likely that BS C is transmitting the rescue channel during the first SUPER__ATTEMPT period 182.

Using the above described procedures, if the BS transmitting the rescue channel is identified and the rescue channel is received, the connection can be continued, and the rescue procedure can be completed. In one embodiment, the rescue channel itself can be used as the new-traffic channel, and handoff may occur later. Without synchronization, even though a MS may correctly identify one transmitting BS that it is able to receive, the MS may fail to adequately receive the rescue channel if other non-transmitting BS signals are also combined and cause interference. Adequate reception may be defined as a quality threshold such as frame error rate or symbol error rate. If the rescue channel data is not adequately received, the procedures described above can be repeated in subsequent SUPER__ATTEMPT time intervals. If rescue channel data, such as a handoff message, is received before the MS has completed synchronization, the MS may use the information in the message to complete or terminate the synchronization immediately.

As a result of repeating the above-described procedures in subsequent SUPER__ATTEMPT time intervals, more and more of the rescue channel data can be received. When enough information from the rescue channel is received (such as the handoff message), the connection can be continued, and the rescue procedure can be completed.

Learning Progression

As the diagrams (trees) illustrated in FIGS. 14 and 16 are traversed, the deassignments and demodulation attempts that take place at each node benefit from knowledge obtained from the subsequent nodes—a learning progression. These trees can be extended to cover any set of N BSs, and as the number N increases, the size and complexity of the trees may increase. It should also be understood that a great number of possible trees may be employed to make the same determination, which is to identify the BS transmitting the rescue channel within a particular SUPER__ATTEMPT time interval. However, some trees may enable the MS to make its determination in fewer frames than other trees, and it would be preferable to identify and use the trees that lead to the most efficient determinations. Embodiments of the present invention minimize the successful detection time by selecting and using the tree with the fastest expected search sequence.

An exhaustive method would define every possible tree, compute the time needed to traverse each tree, and determine the best tree by averaging the time needed to traverse the tree out to each terminal branch. The deviation by each terminal branch from the average time needed to traverse the tree represents a variance. The best tree is the tree with the least expected time to complete synchronization. The choice of best tree may also consider the variance of the expected time to complete synchronization. The tree with the least variance is preferred. The decision and detection process corresponding to that best tree would then be performed in subsequent SUPER__ATTEMPT time intervals. To compute the time needed to traverse each tree, each BS in a MS's updated active set is evaluated and assigned a probability representing the likelihood that the BS can communicate a good rescue channel to the MS. The probabilities are based on a priori information and previous super-attempts and sub-attempts, as described earlier. Note that the relative probabilities of the trees, and not the absolute probabilities, are key to the prioritization of the trees. For example, even a very low probability BS is important if it is high relative to the probabilities of other BSs. Thus, although derivations of expected time for traversal of trees may utilize absolute probability values, the results will reflect only the difference between probabilities. All possible trees are then generated, such as the trees in FIGS. 14 and 16, subject to the limitation that the number of BSs from which the MS will attempt to receive a rescue channel at any one time is less than or equal to the total number of MS fingers, and subject to the limitation that the number of nodes in each tree shall be not more than the number of SUB__ATTEMPT time intervals in one SUPER__ATTEMPT period. Each node represents a frame in which the MS would try to receive the rescue channel from one or more BSs. Note that the nodes of each tree can be traversed to a termination point within one SUPER__ATTEMPT time interval to possibly determine which BS is transmitting the rescue channel, although there is no guarantee that a BS transmitting a good rescue channel will be found within one SUPER__ATTEMPT time interval. The total time needed to traverse each tree to the end depends on the probabilities of success or failure for each of its nodes, and is computed for each possible tree.

For purposes of illustration only, an example derivation of the expected time needed to traverse the tree illustrated in FIG. 14 is provided below. First, the following definitions are established:

$p_s$=Probability{Sector/BS s is received successfully}

$t_S$=t=Time spent trying to receive set S during one SUB_ATTEMPT time interval (assume all equal)

$p_H$=Probability{Set of sectors/BSs S is received successfully} For example: $p_{cd}=p_c+p_d-p_cp_d$ and $p_{cde}=p_c+p_d+p_e-p_dp_c-p_dp_e-p_cp_e+p_cp_dp_e$ N=maximum number of searches before giving up on an acquisition T=total time to search before giving up on an acquisition For a node that loops on failure, such as nodes 1, 4 and 5 in FIG. 14:

$$\begin{aligned}E[\text{Time to acquire } S \text{ (repeating upon failing)}] &= t_S + (1-p_H)(t_S + (1-p_H)(t_S + \cdots)) \\ &= t_S \sum_{i}^{N-1}(1-p_H)^i \text{ where } i = 0 \cdots N = T/t \\ &= t_S(1-(1-p_H)^N)/p_H \text{ (geometric series)}\end{aligned}$$

$$\begin{aligned}P\{S \text{ success}\} &= p_H + (1-p_H)p_H + (1-p_H)^2 p_H + \cdots \\ &= p_H \sum_{i}^{N-1}(1-p_H)^i, \text{ where } i = 0 \cdots N \\ &= 1-(1-p_H)^N \text{ (geometric series)}\end{aligned}$$

For a node that loops on success, such as node 3 in FIG. 14:

$$\begin{aligned}E[\text{Time to fail } S \text{ (repeating upon succeeding)}] &= t_S + p_H(t_S + p_H(t_S + \cdots)) \\ &= t_S \sum_i p_H^i \text{ where } i = 0 \cdots \text{infinity} \\ &= t_S/(1-p_H) \text{ (geometric series)}\end{aligned}$$

$$\begin{aligned}P\{S \text{ failure}\} &= (1-p_H) + (1-p_H)p_H + (1-p_H)p_H^2 + \cdots \\ &= (1-p_H)\sum_i^{N+1} p_H^i, \text{ where } i = 0 \cdots N \\ &= (1-p_H)(1-p_H^N) \text{ (geometric series)}\end{aligned}$$

Thus, in the example tree of FIG. 14:

$E[\text{Time to acquire } cde \text{ (node 1)}]=t_{cde}(1-(1-p_{cde})^N)/p_{cde}$ $E[\text{Time to traverse node 2}]=t_{cd}$ $E[\text{Time to fail node 3}]=t_c/(1-p_c)$ $E[\text{Time to acquire } e \text{ (node 4)}]=t_e(1-(1-p_e)^N)/p_e$ $E[\text{Time to acquire } d \text{ (node 5)}]=t_d(1-(1-p_d)^N)/p_d$ $E[\text{Time to traverse tree}] = E[\text{Time to acquire } cde \text{ (node 1)}] +$
$P\{cde \text{ success}\}(E[\text{Time to traverse node 2}] +$
$p_{cd}(E[\text{Time to traverse node 3}] +$
$E[\text{Time to acquire } d \text{ (node 5)}]) +$
$(1-p_{cd})(E[\text{Time to acquire } e \text{ (node 4)}]))$ $= t_{cde}(1-(1-p_{cde})^N)/p_{cde} + (1-(1-p_{cde})^N)$
$(t_{cd} + p_{cd}(t_c/(1-p_c) + t_d(1-(1-p_d)^N)/p_d) +$
$(1-p_{cd})(t_e(1-(1-p_e)^N)/p_e))$ If the following assumptions are made:

all $t_s$=t, (i.e. it takes the same amount of time to search every hypothesis)

N=1 (only one attempt before proceeding)

then $E[\text{Time to traverse tree}]=t[1+2p_{cde}+p_{cde}\,p_{cd}/(1-p_c)]$

Notice that it will take at least t to acquire because node 1 must be executed at least once. If node 1 succeeds (with probability $p_{cde}$), then the time is at least 3t. This can be seen from FIG. 14, because at least nodes 1, 2, and either 3 or 4, must be traversed.

The sample computation described above is typical of computations that can be derived by those skilled in the art for determining the time needed to traverse any tree. It should be understood, however, that as the number of BSs transmitting the rescue channel increases, these computations quickly become complex.

In other embodiments of the present invention, the probabilities $p_s$ and $p_H$ may take into account different SUB_ATTEMPT durations, and the possibility that a fade could be occurring at the time the MS is attempting to receive a rescue channel from a BS (during the SUB_ATTEMPT time interval). Expanding the SUB_ATTEMPT time interval increases the chance of finding the BS, but also increases the chance that a fade could occur during that SUB_ATTEMPT time interval, which decreases the chance of finding the BS. Thus, the overall probability of finding the BS can be expressed as the probability that the BS is transmitting $p_s$ multiplied by the probability that the MS is not encountering a fade, which will change depending on the duration of the SUB_ATTEMPT time interval.

The quantitative impact of variable durations of SUB_ATTEMPT periods may be considered by, for example, representing the duration of the attempt by M periods of equal duration (such as a frame length), and expressing the probability of reception by the MS as the product of the probability of transmission and the probability of lack of fading. Assuming that the probabilities are the same independent of the frames, the probability of reception for a single frame may be written as $p_s=p_s(1 \text{ frame})=p_{tx}(1-p_{fade})$, where $p_{tx}$ is the probability the base station is transmitting and $p_{fade}$ is the probability of a fade during a frame, which could be represented by the frame error rate. If the MS monitors for M frames, it need only receive one or more (up to M) frames to succeed in synchronization. With M frames there are "M choose P" combinations in which P frames can be received successfully out of M. Mathematically, "M choose P" can be evaluated according to the following formula: "M choose P"=M!/((M−P)!P!) where ! represents the factorial operation.

Thus for any M, the probability of successful synchronization to s over M frames, $p_s(M)$ is:

$$p_s(M) = \sum_{i=1\cdots M} (\text{``}M \text{ choose } i\text{''}) p_s^i (1-p_s)^{M-i}$$

Evaluating this expression for M=3 and 2 gives:

$p_s(3) = 3p_s(1-p_s)^2 + 3p_s^2(1-p_s) + p_s^3$ and $p_s(2) = 2p_s(1-p_s) + p_s^2$ Note that $p_s(3) - p_s(2) = p_s(1 - p_s + p_s^2) > 0$ and hence a longer period increases the probability of synchronization at the expense of time.

In further embodiments, the probabilities $p_s$ and $p_H$ may take into account the fact that the probability of receiving a good rescue channel will be lowered if one or more of the MS rake receiver fingers is receiving something other than a rescue channel, which will degrade the reception of the rescue channel as described above.

The probability values $p_s$ and $p_H$ may also be affected by the information made available to the network at the time of the failure. For example, if the MS fades without transmitting a current PSMM, the network will have no current information on what the MS was requesting, which hinders the network's ability to prioritize its network active set and therefore, the network's ability to transmit the rescue channels from BSs with a higher probability of success. The net effect is a lowering of probability values $p_s$ and $p_H$.

Another example is a case where a MS has, in the past, transmitted a number of PSMMs. Consider the case where the last PSMM requested sectors C, D, and E but the PSMM was not acknowledged by the BS as having been received. Consider further where the second last PSMM requested sectors A, B, and C only, and was acknowledged by the BS but the MS was not directed to handoff. In this case, even though the MS may weigh the priorities of sectors C, D, and E equally high (higher than A and B), the MS should consider that the BS may not know the D and E are of interest and lower the priority of D and E relative to C.

In other embodiments of the present invention, the exhaustive method described above may be improved using dynamic programming or memo-ization methodologies to solve for the optimal (shortest) structured search sequence (tree). Dynamic programming and memo-ization are standard computer science problem solving techniques that can be found in the literature. For a description of these techniques, see Thomas H. Cormen, Charles E. Leiserson, Ronald L. Rivest, "Introduction to Algorithms", 2nd edition (Sep. 1, 2001), MIT Press; ISBN:0262032937. In general, the number of BSs are likely to be small enough that the processing required should be easily accomplished in time for rake management processing. In some MSs, the computation power and time may not permit for such operations, in which case general structures may be "hard-coded" for use in appropriate situations. Conceptually, the goal of dynamic programming and memo-ization is explained below.

Dynamic programming and memo-ization can be used in embodiments of the present invention to identify a particular tree to traverse such that the BS transmitting the good rescue channel can be identified in a minimum time, wherein prior calculations can be re-used to save processing time.

The MS or network need not perform dynamic programming or memo-ization computations for every possible tree. The MS may store, in advance, the result of a dynamic programming or memo-ization algorithm generic to the case where two BSs could be transmitting the rescue channel, three BSs could be transmitting the rescue channel, four BSs, etc. In addition, some of the computations for the two BS case may be re-usable in the three BS case, etc. Thus, when faced with an actual number of BSs that could possibly be transmitting the rescue channel, the MS will use the pre-stored results to save processing time.

In further embodiments of the present invention, while evaluating trees using dynamic programming or memo-ization, trees that would require excessively long processing times in order to determine the tree formulae may be eliminated from consideration. For example, it may be known that the tree formulae for a four-sector tree takes an excessive amount of processing time. Thus, only three-sector trees may be considered. In this example, the MS would not try to receive a rescue channel from more than three BSs at a time.

In addition, a time threshold may also be established for eliminating trees for which the estimated time needed to traverse that tree is excessively long. The estimated time may be effectively evaluated by plugging in determined probabilities into pre-evaluated formulae corresponding to trees or families of trees to determine if the results are below a minimum threshold. For example, if the threshold is exceeded for the optimal four-sector tree, then the MS may consider only three-sector trees.

Although the rescue synchronization concepts described hereinabove used a cellular network as an example, the basic concept of synchronizing the MS and network during rescue are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network and at least one mobile station (MS) for enabling communications with the at least one MS, the network including one or more base stations (BSs) capable of transmitting a rescue channel to a MS having a connection with the network that has become a potentially failing connection for assisting in rescuing the connection, a method for synchronizing transmission of the rescue channel with MS attempts at receiving the rescue channel to increase a likelihood that the MS will receive the rescue channel and assist in rescuing the connection, the method comprising:

transmitting the rescue channel from one or more BSs at a time during each of one or more SUPER_ATTEMPT time intervals;

configuring the MS to attempt to receive the rescue channel from the one or more BSs in a sequence during each of a plurality of SUB_ATTEMPT periods, wherein a predetermined number of SUB_ATTEMPT periods greater than one are contained in one SUPER_ATTEMPT time interval; and coordinating the transmission of the rescue channel from the one or more BSs with the MS configurations to increase the likelihood that the MS is configured to receive the rescue channel from a particular BS at a time when the particular BS is transmitting the rescue channel.

2. The method as recited in claim 1, further including configuring the MS to attempt to receive the rescue channel from one BS at a time in a sequence during each of the one or more SUB_ATTEMPT periods, the sequence defined by MS ordering criteria based on MS probability values assigned to each of the BSs in the sequence, the MS probability values representing the likelihood that the rescue channel transmitted by the BS will be received by the MS.

3. The method as recited in claim 2, wherein the sequence is altered during each SUPER_ATTEMPT time interval by changing the MS ordering criteria at each SUPER_ATTEMPT time interval.

4. The method as recited in claim 2, further including transmitting the rescue channel from the one or more BSs at a time in a sequence, the sequence defined by network ordering criteria based on network probability values assigned to each of the BSs in the sequence, the network probability values representing a likelihood that the rescue channel transmitted by the BS will be received by the MS.

5. The method as recited in claim 1, further including executing a first search tree within a first SUPER_ATTEMPT time interval, the execution of the first search tree comprising:
configuring the MS during a first SUB_ATTEMPT period to attempt to receive the rescue channel from one or more BSs, and determining whether the attempt to receive the rescue channel from the one or more BSs resulted in the MS receiving the rescue channel;
selectively reconfiguring the MS during a subsequent SUB_ATTEMPT period to attempt to receive the rescue channel from a modified set of BSs in accordance with the first search tree and results from a previous SUB_ATTEMPT period, and determining whether the attempt to receive the rescue channel from the modified set of BSs resulted in the MS receiving the rescue channel;
repeating the selective reconfiguration of the MS and the attempts to receive the rescue channel as dictated, if at all, by the first search tree and the results of previous selective reconfigurations; and
terminating the selective reconfiguration of the MS and the attempts to receive the rescue channel when an end of the first search tree is reached, or the BS transmitting the rescue channel is identified, or when an end of the first SUPER_ATTEMPT time interval is reached.

6. The method as recited in claim 5, further including executing one or more different search trees in subsequent SUPER_ATTEMPT time intervals for identifying one or more BSs transmitting the rescue channel.

7. The method as recited in claim 5, further including applying probability values assigned to each of the BSs to the steps of configuring the MS during the first SUB_ATTEMPT period, selectively reconfiguring the MS during the subsequent SUB_ATTEMPT period, and repeating the selective reconfiguration of the MS and the attempts to receive the rescue channel, the probability values representing a likelihood that the rescue channel transmitted by the BS will be received by the MS.

8. The method as recited in claim 7, further including recomputing the probability values assigned to each of the BSs at each SUB_ATTEMPT period, taking into account changing conditions and the result of attempts to receive the rescue channel during previous SUB_ATTEMPT periods.

9. The method as recited in claim 7, wherein the probability values assigned to each of the BSs are adjustable to account for varying SUB_ATTEMPT durations, fades, degraded reception of the rescue channel, or pilot strength information made available to the network prior to a start of the potentially failing connection.

10. The method as recited in claim 5, wherein prior to executing the first search tree, the method further includes:
defining a plurality of search trees, each search tree for identifying the BS transmitting the rescue channel from within the plurality of BSs;
computing a time needed to traverse each search tree; and
identifying the first search tree as the search tree having a lowest traversal time.

11. The method as recited in claim 5, wherein prior to executing the first search tree, the method further includes utilizing dynamic programming or memo-ization algorithms to identify the first search tree as the search tree having a lowest traversal time.

12. The method as recited in claim 11, further including executing the dynamic programming or memo-ization algorithms on generic N-sector search trees to identify the generic N-sector search tree having a lowest traversal time, and pre-storing resulting tree formulas for each of the N-sector trees having the lowest traversal times prior to a start of the potentially failing connection.

13. In a system comprising a network and at least one mobile station (MS) for enabling communications with the at least one MS, the network including one or more base stations (BSs) capable of transmitting a rescue channel during each of one or more SUPER_ATTEMPT time intervals to a MS having a connection with the network that has become a potentially failing connection for assisting in rescuing the connection, a method for synchronizing transmission of the rescue channel with MS attempts at receiving the rescue channel to increase a likelihood that the MS will receive the rescue channel and assist in rescuing the connection, the method comprising:
configuring the MS to attempt to receive the rescue channel from the one or more BSs in a sequence during each of plurality of SUB_ATTEMPT periods, wherein a predetermined number of SUB_ATTEMPT periods greater than one are contained in one SUPER_ATTEMPT time interval; and
coordinating the transmission of the rescue channel from the one or more BSs with the MS configurations to increase the likelihood that the MS is configured to receive the rescue channel from a particular BS at a time when the particular BS is transmitting the rescue channel.

14. The method as recited in claim 13, further including configuring the MS to attempt to receive the rescue channel from one BS at a time in a sequence during each of the one or more SUB_ATTEMPT periods, the sequence defined by MS ordering criteria based on MS probability values assigned to each of the BSs in the sequence, the MS probability values representing the likelihood that the rescue channel transmitted by the BS will be received by the MS.

15. The method as recited in claim 14, wherein the sequence is altered during each SUPER_ATTEMPT time interval by changing the MS ordering criteria at each SUPER_ATTEMPT time interval.

16. The method as recited in claim 13, further including executing a first search tree within a first SUPER_ATTEMPT time interval, the execution of the first search tree comprising:
configuring the MS during a first SUB_ATTEMPT period to attempt to receive the rescue channel from one or more BSs, and determining whether the attempt to receive the rescue channel from the one or more BSs resulted in the MS receiving the rescue channel;

selectively reconfiguring the MS during a subsequent SUB_ATTEMPT period to attempt to receive the rescue channel from a modified set of BSs in accordance with the first search tree and results from a previous SUB_ATTEMPT period, and determining whether the attempt to receive the rescue channel from the modified set of BSs resulted in the MS receiving the rescue channel;

repeating the selective reconfiguration of the MS and the attempts to receive the rescue channel as dictated, if at all, by the first search tree and the results of previous selective reconfigurations; and terminating the selective reconfiguration of the MS and the attempts to receive the rescue channel when an end of the first search tree is reached, or the BS transmitting the rescue channel is identified, or when an end of the first SUPER_ATTEMPT time interval is reached.

17. The method as recited in claim 16, further including executing one or more different search trees in subsequent SUPER_ATTEMPT time intervals for identifying one or more BSs transmitting the rescue channel.

18. The method as recited in claim 16, further including applying probability values assigned to each of the BSs to the steps of configuring the MS during the first SUB_ATTEMPT period, selectively reconfiguring the MS during the subsequent SUB_ATTEMPT period, and repeating the selective reconfiguration of the MS and the attempts to receive the rescue channel, the probability values representing a likelihood that the rescue channel transmitted by the BS will be received by the MS.

19. The method as recited in claim 18, further including recomputing the probability values assigned to each of the BSs at each SUB_ATTEMPT period, taking into account changing conditions and the result of attempts to receive the rescue channel during previous SUB_ATTEMPT periods.

20. The method as recited in claim 18, wherein the probability values assigned to each of the BSs are adjustable to account for varying SUB_ATTEMPT durations, fades, degraded reception of the rescue channel, or pilot strength information made available to the network prior to a start of the potentially failing connection.

21. The method as recited in claim 16, wherein prior to executing the first search tree, the method further includes:

defining a plurality of search trees, each search tree for identifying the BS transmitting the rescue channel from within the plurality of BSs;

computing a time needed to traverse each search tree; and identifying the first search tree as the search tree having a lowest traversal time.

22. The method as recited in claim 16, wherein prior to executing the first search tree, the method further includes utilizing dynamic programming or memo-ization algorithms to identify the first search tree as the search tree having a lowest traversal time.

23. The method as recited in claim 22, further including executing the dynamic programming or memo-ization algorithms on generic N-sector search trees to identify the generic N-sector search tree having a lowest traversal time, and pre-storing resulting tree formulas for each of the N-sector trees having the lowest traversal times prior to a start of the potentially failing connection.

24. In a system comprising a network and at least one mobile station (MS) for enabling communications with the at least one MS, one of the MSs having a connection with the network that has become a potentially failing connection and capable of receiving a rescue channel from one or more base stations (BSs) in the network for rescuing the connection, a method for assisting in synchronizing transmission of the rescue channel to increase a likelihood that the MS will receive the rescue channel and assist in rescuing the connection, the method comprising:

transmitting the rescue channel from one or more BSs at a time in a sequence, the sequence defined by network ordering criteria based on network probability values assigned to each of the BSs in the sequence, the network probability values representing a likelihood that the rescue channel transmitted by the BS will be received by the MS.

25. The method as recited in claim 24, the MS for executing a first search tree within a first SUPER_ATTEMPT time interval to identify the BS transmitting the rescue channel, and prior to a start of the potentially failing connection, the method further including:

defining a plurality of search trees, each search tree for identifying the BS transmitting the rescue channel from within the plurality of BSs;

computing a time needed to traverse each search tree;

identifying the first search tree as the search tree having a lowest traversal time; and communicating the first search tree to the MS.

26. The method as recited in claim 25, further including utilizing dynamic programming or memo-ization algorithms to identify the first search tree as the search tree having a lowest traversal time.

27. The method as recited in claim 26, further including executing the dynamic programming or memo-ization algorithms on generic N-sector search trees to identify the generic N-sector search tree having a lowest traversal time, and communicating tree formulas resulting from the execution of the dynamic programming or memo-ization algorithms for each of the N-sector trees having the lowest traversal times to the MS.

28. A system for enabling communications between a network and a mobile station (MS) and for synchronizing transmission of a rescue channel with MS attempts at receiving the rescue channel when the MS has a connection with the network that has become a potentially failing connection, the synchronization for increasing a likelihood that the MS will receive the rescue channel and assist in rescuing the connection, the system comprising:

a network, the network including one or more base stations (BSs) and a network processor, the network processor programmed for transmitting a rescue channel from the one or more BSs during each of one or more SUPER_ATTEMPT time intervals; and a MS communicatively coupled to the network and having a MS processor, the MS processor programmed for configuring the MS to attempt to receive the rescue channel from the one or more BSs in a sequence during each of plurality of SUB_ATTEMPT periods, wherein a predetermined number of SUB_ATTEMPT periods greater than one are contained in one SUPER_ATTEMPT time interval;

wherein the network and the MS coordinate the transmission of the rescue channel from the one or more BSs with the MS configurations to increase the likelihood that the MS is configured to receive the rescue channel from a particular BS at a time when the particular BS is transmitting the rescue channel.

29. The system as recited in claim 28, the MS processor further programmed for configuring the MS to attempt to receive the rescue channel from one BS at a time in a sequence during each of the one or more SUB_ATTEMPT periods, the sequence defined by MS ordering criteria based on MS probability values assigned to each of the BSs in the sequence, the MS probability values representing the likelihood that the rescue channel transmitted by the BS will be received by the MS.

30. The system as recited in claim 29, the MS processor further programmed for altering the sequence during each SUPER_ATTEMPT time interval by changing the MS ordering criteria at each SUPER_ATTEMPT time interval.

31. The system as recited in claim 29, the network processor further programmed for transmitting the rescue channel from the one or more BSs at a time in a sequence, the sequence defined by network ordering criteria based on network probability values assigned to each of the BSs in the sequence, the network probability values representing a likelihood that the rescue channel transmitted by the BS will be received by the MS.

32. The system as recited in claim 28, the MS processor further programmed for executing a first search tree within a first SUPER_ATTEMPT time interval, the execution of the first search tree comprising:
configuring the MS during a first SUB_ATTEMPT period to attempt to receive the rescue channel from one or more BSs, and determining whether the attempt to receive the rescue channel from the one or more BSs resulted in the MS receiving the rescue channel;
selectively reconfiguring the MS during a subsequent SUB_ATTEMPT period to attempt to receive the rescue channel from a modified set of BSs in accordance with the first search tree and results from a previous SUB_ATTEMPT period, and determining whether the attempt to receive the rescue channel from the modified set of BSs resulted in the MS receiving the rescue channel;
repeating the selective reconfiguration of the MS and the attempts to receive the rescue channel as dictated, if at all, by the first search tree and the results of previous selective reconfigurations; and
terminating the selective reconfiguration of the MS and the attempts to receive the rescue channel when an end of the first search tree is reached, or the BS transmitting the rescue channel is identified, or when an end of the first SUPER_ATTEMPT time interval is reached.

33. The system as recited in claim 32, the MS processor further programmed for executing one or more different search trees in subsequent SUPER_ATTEMPT time intervals for identifying one or more BSs transmitting the rescue channel.

34. The system as recited in claim 32, the MS processor further programmed for applying probability values assigned to each of the BSs to the steps of configuring the MS during the first SUB_ATTEMPT period, selectively reconfiguring the MS during the subsequent SUB_ATTEMPT period, and repeating the selective reconfiguration of the MS and the attempts to receive the rescue channel, the probability values representing a likelihood that the rescue channel transmitted by the BS will be received by the MS.

35. The system as recited in claim 34, the MS processor further programmed for recomputing the probability values assigned to each of the BSs at each SUB_ATTEMPT period, taking into account changing conditions and the result of attempts to receive the rescue channel during previous SUB_ATTEMPT periods.

36. The system as recited in claim 34, the MS processor further programmed for adjusting the probability values assigned to each of the BSs to account for varying SUB_ATTEMPT durations, fades, degraded reception of the rescue channel, or pilot strength information made available to the network prior to a start of the potentially failing connection.

37. The system as recited in claim 32, the MS processor is further programmed for, prior to executing the first search tree:
defining a plurality of search trees, each search tree for identifying the BS transmitting the rescue channel from within the plurality of BSs;
computing a time needed to traverse each search tree; and
identifying the first search tree as the search tree having a lowest traversal time.

38. The system as recited in claim 32, the MS processor further programmed for, prior to executing the first search tree, utilizing dynamic programming or memo-ization algorithms to identify the first search tree as the search tree having a lowest traversal time.

39. The system as recited in claim 38, the MS processor further programmed for executing the dynamic programming or memo-ization algorithms on generic N-sector search trees to identify the generic N-sector search tree having a lowest traversal time, and pre-storing resulting tree formulas for each of the N-sector trees having the lowest traversal times prior to a start of the potentially failing connection.

40. A mobile station (MS) for communicating with a network and for assisting in rescuing the MS when the MS has a connection with the network that has become a potentially failing connection, the network including one or more base stations (BSs) capable of transmitting a rescue channel during each of one or more SUPER_ATTEMPT time intervals to the MS, the MS comprising:
a MS processor programmed for
configuring the MS to attempt to receive the rescue channel from the one or more BSs in a sequence during each of a plurality of SUB_ATTEMPT periods, wherein a predetermined number of SUB_ATTEMPT periods greater than one are contained in one SUPER_ATTEMPT time interval, and
coordinating the transmission of the rescue channel from the one or more BSs with the MS configurations to increase the likelihood that the MS is configured to receive the rescue channel from a particular BS at a time when the particular BS is transmitting the rescue channel.

41. The MS as recited in claim 40, the MS processor further programmed for configuring the MS to attempt to receive the rescue channel from one BS at a time in a sequence during each of the one or more SUB_ATTEMPT periods, the sequence defined by MS ordering criteria based on MS probability values assigned to each of the BSs in the sequence, the MS probability values representing the likelihood that the rescue channel transmitted by the BS will be received by the MS.

42. The MS as recited in claim 41, the MS processor further programmed for altering the sequence during each SUPER_ATTEMPT time interval by changing the MS ordering criteria at each SUPER_ATTEMPT time interval.

43. The MS as recited in claim 40, the MS processor further programmed for executing a first search tree within a first SUPER_ATTEMPT time interval, the execution of the first search tree comprising:
configuring the MS during a first SUB_ATTEMPT period to attempt to receive the rescue channel from one or more BSs, and determining whether the attempt to receive the rescue channel from the one or more BSs resulted in the MS receiving the rescue channel;

selectively reconfiguring the MS during a subsequent SUB_ATTEMPT period to attempt to receive the rescue channel from a modified set of BSs in accordance with the first search tree and results from a previous SUB_ATTEMPT period, and determining whether the attempt to receive the rescue channel from the modified set of BSs resulted in the MS receiving the rescue channel;

repeating the selective reconfiguration of the MS and the attempts to receive the rescue channel as dictated, if at all, by the first search tree and the results of previous selective reconfigurations; and terminating the selective reconfiguration of the MS and the attempts to receive the rescue channel when an end of the first search tree is reached, or the BS transmitting the rescue channel is identified, or when an end of the first SUPER_ATTEMPT time interval is reached.

44. The MS as recited in claim 43, the MS processor further programmed for executing one or more different search trees in subsequent SUPER_ATTEMPT time intervals for identifying one or more BSs transmitting the rescue channel.

45. The MS as recited in claim 43, the MS processor further programmed for applying probability values assigned to each of the BSs to the steps of configuring the MS during the first SUB_ATTEMPT period, selectively reconfiguring the MS during the subsequent SUB_ATTEMPT period, and repeating the selective reconfiguration of the MS and the attempts to receive the rescue channel, the probability values representing a likelihood that the rescue channel transmitted by the BS will be received by the MS.

46. The MS as recited in claim 45, the MS processor further programmed for recomputing the probability values assigned to each of the BSs at each SUB_ATTEMPT period, taking into account changing conditions and the result of attempts to receive the rescue channel during previous SUB_ATTEMPT periods.

47. The MS as recited in claim 45, the MS processor further programmed for adjusting the probability values assigned to each of the BSs to account for varying SUB_ATTEMPT durations, fades, degraded reception of the rescue channel, or pilot strength information made available to the network prior to a start of the potentially failing connection.

48. The MS as recited in claim 43, the MS processor further programmed for, prior to executing the first search tree:

defining a plurality of search trees, each search tree for identifying the BS transmitting the rescue channel from within the plurality of BSs;

computing a time needed to traverse each search tree; and identifying the first search tree as the search tree having a lowest traversal time.

49. The MS as recited in claim 43, the MS processor further programmed for, prior to executing the first search tree, utilizing dynamic programming or memo-ization algorithms to identify the first search tree as the search tree having a lowest traversal time.

50. The MS as recited in claim 49, the MS processor further programmed for executing the dynamic programming or memo-ization algorithms on generic N-sector search trees to identify the generic N-sector search tree having a lowest traversal time, and pre-storing resulting tree formulas for each of the N-sector trees having the lowest traversal times prior to a start of the potentially failing connection.

51. A system for enabling communications with at least one mobile station (MS) and for assisting in rescuing a MS having a connection with the network that has become a potentially failing connection, the MS capable of receiving a rescue channel for rescuing the connection, the system for assisting in synchronizing transmission of the rescue channel to increase a likelihood that the MS will receive the rescue channel and assist in rescuing the connection, the system comprising:

a network, the network including one or more base stations (BSs) capable of transmitting the rescue channel during each of one or more SUPER_ATTEMPT time intervals, and a network processor programmed for transmitting the rescue channel from one or more BSs at a time in a sequence, the sequence defined by network ordering criteria based on network probability values assigned to each of the BSs in the sequence, the network probability values representing a likelihood that the rescue channel transmitted by the BS will be received by the MS.

52. The system as recited in claim 51, the MS for executing a first search tree within a first SUPER_ATTEMPT time interval to identify the BS transmitting the rescue channel, the network processor further programmed for, prior to a start of the potentially failing connection:

defining a plurality of search trees, each search tree for identifying the BS transmitting the rescue channel from within the plurality of BSs;

computing a time needed to traverse each search tree;

identifying the first search tree as the search tree having a lowest traversal time; and communicating the first search tree to the MS.

53. The system as recited in claim 52, the network processor further programmed for utilizing dynamic programming or memo-ization algorithms to identify the first search tree as the search tree having a lowest traversal time.

54. The system as recited in claim 53, the network processor further programmed for executing the dynamic programming or memo-ization algorithms on generic N-sector search trees to identify the generic N-sector search tree having a lowest traversal time, and communicating tree formulas resulting from the execution of the dynamic programming or memo-ization algorithms for each of the N-sector trees having the lowest traversal times to the MS.

* * * * *